(12) United States Patent
Tomei et al.

(10) Patent No.: US 12,001,237 B2
(45) Date of Patent: Jun. 4, 2024

(54) PATTERN-BASED CACHE BLOCK COMPRESSION

(71) Applicant: Advanced Micro Devices, Inc., Santa Clara, CA (US)

(72) Inventors: Matthew Tomei, Champaign, IL (US); Shomit N. Das, Austin, TX (US); David A. Wood, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 114 days.

(21) Appl. No.: 17/029,158

(22) Filed: Sep. 23, 2020

(65) Prior Publication Data

US 2021/0157485 A1 May 27, 2021

Related U.S. Application Data

(60) Provisional application No. 62/939,990, filed on Nov. 25, 2019.

(51) Int. Cl.
*G06F 12/00* (2006.01)
*G06F 3/06* (2006.01)
*G06F 12/0802* (2016.01)

(52) U.S. Cl.
CPC .......... *G06F 3/0608* (2013.01); *G06F 3/0655* (2013.01); *G06F 3/0676* (2013.01); *G06F 3/0679* (2013.01); *G06F 12/0802* (2013.01)

(58) Field of Classification Search
CPC .... G06F 3/0608; G06F 3/0655; G06F 3/0676; G06F 3/0679; G06F 12/0802; G06F 12/0886; G06F 12/0888; Y02D 10/00

(Continued)

(56) References Cited

U.S. PATENT DOCUMENTS 6,618,725 B1 9/2003 Fukuda et al.
10,542,457 B2 1/2020 Maheshwari et al.
(Continued)

FOREIGN PATENT DOCUMENTS

KR 20170139530 A 12/2017

OTHER PUBLICATIONS

Arelakis, A. & Stenstrom, P., "SC2: A Statistical Compression Cache Scheme", ACM SIGARCH Computer Architecture News, vol. 42, 12 pgs., Jun. 2014.

(Continued)

*Primary Examiner* — Mardochee Chery
(74) *Attorney, Agent, or Firm* — Volpe Koenig

(57) ABSTRACT

Systems, methods, and devices for performing pattern-based cache block compression and decompression. An uncompressed cache block is input to the compressor. Byte values are identified within the uncompressed cache block. A cache block pattern is searched for in a set of cache block patterns based on the byte values. A compressed cache block is output based on the byte values and the cache block pattern. A compressed cache block is input to the decompressor. A cache block pattern is identified based on metadata of the cache block. The cache block pattern is applied to a byte dictionary of the cache block. An uncompressed cache block is output based on the cache block pattern and the byte dictionary. A subset of cache block patterns is determined from a training cache trace based on a set of compressed sizes and a target number of patterns for each size.

20 Claims, 13 Drawing Sheets

(58) Field of Classification Search
USPC .......................................................... 711/118
See application file for complete search history.

(56) References Cited

U.S. PATENT DOCUMENTS

| | | | |
|---|---|---|---|
| 2003/0135694 A1 | 7/2003 | Naffziger et al. | |
| 2014/0281249 A1* | 9/2014 | Waldspurger | G06F 12/0802 |
| | | | 711/129 |
| 2015/0178214 A1 | 6/2015 | Alameldeen et al. | |
| 2016/0118998 A1 | 4/2016 | Finlay | |
| 2016/0162218 A1* | 6/2016 | Callaway | G06F 3/0608 |
| | | | 707/692 |
| 2017/0091107 A1* | 3/2017 | Peterson | G06F 12/123 |
| 2018/0026656 A1* | 1/2018 | Gopal | G06F 1/183 |
| | | | 341/51 |
| 2018/0081815 A1* | 3/2018 | Venkumahanti | G06F 12/0862 |
| 2019/0095331 A1* | 3/2019 | Diamand | G06F 12/0811 |
| 2020/0133866 A1 | 4/2020 | Das et al. | |

OTHER PUBLICATIONS

Alameldeen, A. R. & Wood, D. A., "Adaptive Cache Compression for High-Performance Processors", Proceedings of the 31st Annual International Symposium on Computer Architecture, 12 pgs., Jun. 2004.

Chen, X., et. al., "C-Pack: A High-Performance Microprocessor Cache Compression Algorithm", IEEE Transactions on Very Large Scale Integration Systems, vol. 18, No. 8; 13 pgs., Aug. 2010.

Pekhimenko, G., et al., " Base-Delta-Immediate Compression: Practical Data Compression for on-chip Caches", Proceedings of the 21st International Conference on Parallel Architecture and Compilation Techniques, ACM, 12 pgs., Sep. 2012.

Sardashti, S. & Wood, D. A., "Decoupled Compressed Cache: Exploiting Spatial Locality for Energy Optimized Compressed Caching", 46th Annual IEEE/ACM International Symposium on Microarchitecture, ACM, 12 pgs., Dec. 2013.

Panda, B., & Seznec, A., "Dictionary Sharing: An Efficient Cache Compression Scheme for Compressed Caches", 49th Annual IEEE/ACM International Symposium on Microarchitecture, 12 pgs., 2016.

Alameldeen, A. R. & Wood, D. A., "Frequent Pattern Compression: A Significance-based Compression Scheme for L2 Caches", University Wisconsin-Madison Computer Sciences Department Technical Report #1500, 18 pgs., May 2004.

Arelakis, A., et. al., "HyComp: A Hybrid Cache Compression Method for Selection of Data-Type-Specific Compression Methods", Proceedings of the 48th International Symposium on Microarchitecture, 12 pgs., Dec. 2015.

Nguyen, T. M., & Wentzlaff, D., "MORC: A Manycore-Oriented Compressed Cache", 48th Annual IEEE/ACM International Symposium on Microarchitecture, 13 pgs., 2015.

Pekhimenko, G., "Practical Data Compression for Modern Memory Hierarchies", Carnegie Mellon University Computer Science Department Thesis, 197 pgs., Jul. 2016.

Sardashti, S., et al., "Skewed Compressed Caches", Proceedings of the 47th Annual IEEE/ACM International Symposium on Microarchitecture, 12 pgs., 2014.

Sardashti, S., et. al., "Yet Another Compressed Cache: A Low-Cost Yet Effective Compressed Cache", ACM Transactions on Architecture and Code Optimization, vol. 13, No. 3, Article 27, ACM, 25 pgs., Sep. 2016.

Dusser, J., et. al., "Zero-content Augmented Caches", Proceedings of the 23rd International Conference on Supercomputing, ACM, 10 pgs., Jun. 2009.

Young, V., et. al., "Enabling Transparent Memory-Compression for Commodity Memory Systems", downloaded from: http://memlab.ece.gatech.edu/papers/HPCA_2019_1.pdf on Sep. 22, 2020, 12 pgs.

Abali, B., et. al., "Memory Expansion Technology (MXT): Software Support and Performance", downloaded from: https://pdfs.semanticscholar.org/1498/a9aba1c9ebff48a1c7c3bd77649bf21e0ed0.pdf?ga=2.199023471.1712084613.1600791320-1255563064.1600791320 on Sep. 22, 2020, 15 pgs.

Shafiee, A., et. al., "MemZip: Exploring Unconventional Benefits from Memory Compression", IEEE 20th International Symposium on High Performance Computer Architecture, 12 pgs., 2014.

Kim, S., et. al., "Transparent Dual Memory Compression Architecture", downloaded from http://calab.kaist.ac.kr:8080/~jhuh/papers/kim_pact17.pdf on Sep. 22, 2020, 13 pgs.

Rhu, M., et. al., "Compressing DMA Engine: Leveraging Activation Sparsity for Training Deep Neural Networks", arXiv:1705.01626v1, arXiv, 14 pgs., May 2017.

Yang, L., et. al., "High-Performance Operating System Controlled Memory Compression", Proceedings of the 43rd annual Design Automation Conference, ACM, 4 pgs., Jul. 2006.

Sathish, V., et. al., "Lossless and Lossy Memory I/O Link Compression for Improving Performance of GPGPU Workloads", Proceedings of the 21st Conference on Parallel Architectures and Compilation Techniques, ACM, 10 pgs., Sep. 2012.

Kim, J., et. al., "Bit-plane Compression: Transforming Data for Better Compression in Many-core Architectures", Proceedings of the 43rd International Symposium on Computer Architecture, IEEE, 12 pgs., 2016.

Henning, J. L., "SPEC CPU2006 Benchmark Descriptions", downloaded from https://www.spec.org/cpu2006/publications/CPU2006benchmarks.pdf on Sep. 22, 2020, 17 pgs.

Karlin, I., "LULESH Programming Model and Performance Ports Overview", downloaded from: https://computing.llnl.gov/projects/co-design/lulesh_ports1.pdf on Sep. 22, 2020, 17 pgs.

Che, S., et. al., "Rodinia: A Benchmark Suite for Heterogeneous Computing", IEEE International Symposium on Workload Characterization, IEEE, 11 pgs., Oct. 2009.

Lahiry Akshay: "Exploring Compression In The GPU Memory Hierarchy For Graphics And Compute", Dissertation, May 1, 2018, pp. I-VII, 1-79, XP055784055, Boston, Massachusetts, USA Retrieved from the Internet: URL:https://repository.library.northeastern.edu/files/neu:m044c501s/fulltext.pdf *section 2.2*.

* cited by examiner

FIG. 7

PATTERN-BASED CACHE BLOCK COMPRESSION

CROSS REFERENCE TO RELATED APPLICATIONS

This application claims the benefit of U.S. Provisional Application No. 62/939,990, entitled "PATTERN-BASED CACHE BLOCK COMPRESSION," filed Nov. 25, 2019, the contents of which is hereby incorporated by reference herein.

GOVERNMENT LICENSE RIGHTS

This invention was made with government support under the PathForward Project with Lawrence Livermore National Security (Prime Contract No. DE-AC52-07NA27344, Subcontract No. B620717) awarded by the United States Department of Energy (DOE). The Government has certain rights in this invention.

BACKGROUND

A cache memory, or cache, is a hardware memory, typically implemented on the same die as a processor accessing the cache, and configured to reduce the time and/or energy required to access information that is frequently used by the processor as compared with retrieving the information from storage locations that are slower and/or further away from the processor, such as main memory, a backing store, a lower level of cache memory, etc.

Information is typically stored in the cache in units of fixed size which are typically referred to as cache blocks or cache lines. By compressing the information in a fixed-size cache block to a smaller representation (e.g., compressing a 64 byte block to 32 bytes), the capacity of the cache, link bandwidth, and/or memory can be increased. Compressing cache blocks in this way is typically referred to as cache block compression.

Various techniques for compressing cache blocks are also generally applicable to other kinds of data and/or storage devices. In this context, such techniques are typically referred to as data block compression.

BRIEF DESCRIPTION OF THE DRAWINGS

A more detailed understanding can be had from the following description, given by way of example in conjunction with the accompanying drawings wherein:

FIG. 7 is a block diagram illustrating a set of example cache block patterns;

DETAILED DESCRIPTION

Figure 1:
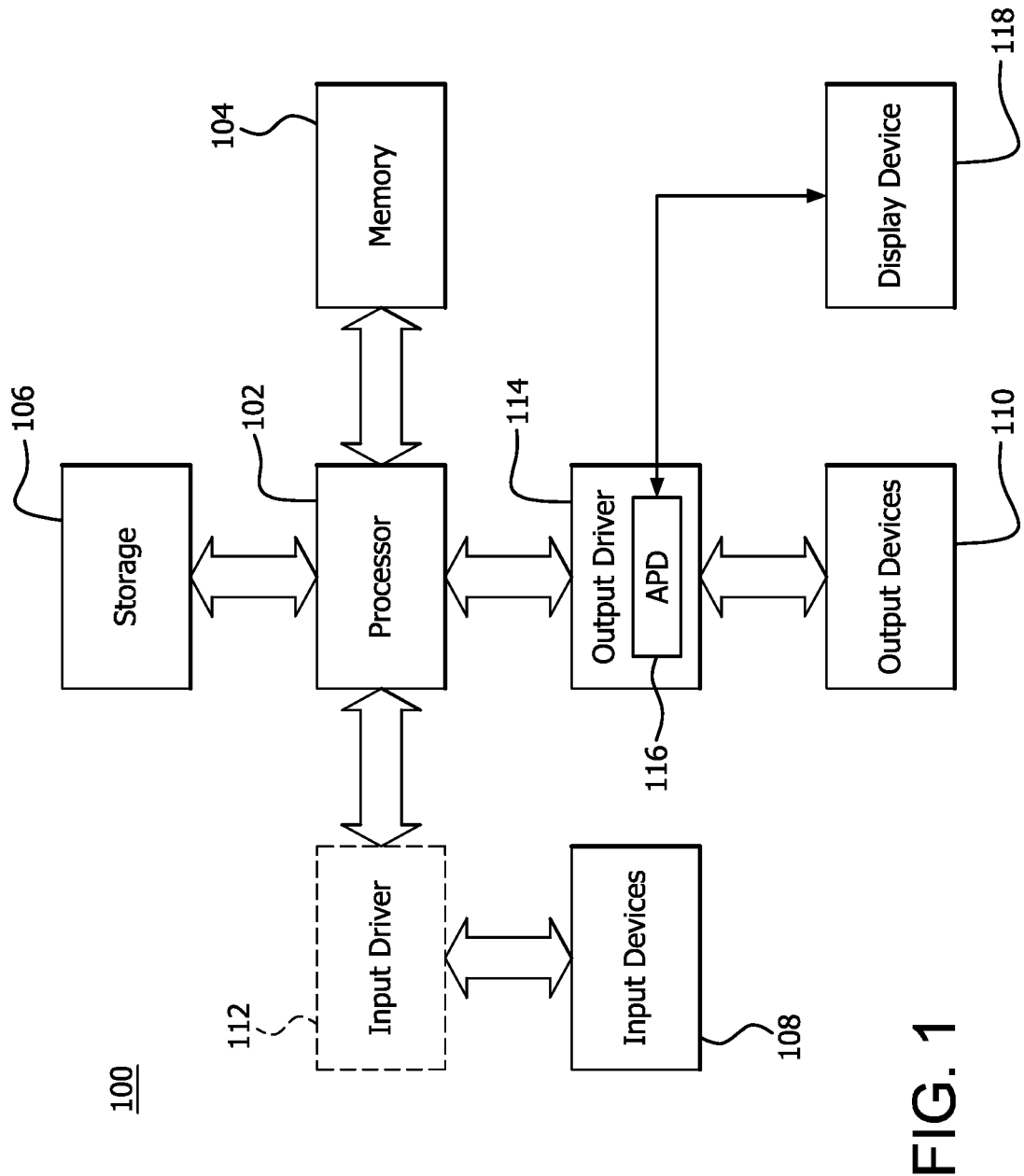
FIG. 1 is a block diagram of an example device in which one or more features of the disclosure can be implemented.

Some implementations provide a compressor and/or a method implemented in a compressor for performing pattern-based cache block compression. An uncompressed cache block is input to the compressor. Byte values are identified within the uncompressed cache block. A cache block pattern is searched for in a set of cache block patterns based on the byte values. A compressed cache block is output based on the byte values and the cache block pattern.

In some implementations, the byte values are converted to symbols and the uncompressed cache block is expressed in terms of the symbols, each symbol representing a particular cache block. In some implementations, the cache block pattern is searched for in the set of cache block patterns based on the byte values by searching the set of cache block patterns based on the symbols. In some implementations, the compressed cache block includes the byte values and an index to the set of cache block patterns. In some implementations, the compressed cache block includes a byte dictionary and metadata. In some implementations, the metadata includes an index to the set of cache block patterns. In some implementations, the byte dictionary includes each of the byte values, and for each of the byte values the byte dictionary includes only one copy.

Some implementations provide a decompressor and/or a method implemented in a decompressor for performing pattern-based cache block decompression. A compressed cache block is input to the decompressor. A cache block pattern is identified based on metadata of the cache block. The cache block pattern is applied to a byte dictionary of the cache block. An uncompressed cache block is output based on the cache block pattern and the byte dictionary.

In some implementations, the compressed block includes byte values and an index to a set of cache block patterns. In some implementations, the byte dictionary includes byte values of the uncompressed cache block. In some implementations, the byte dictionary includes each of the byte values, and for each of the byte values, the byte dictionary includes only one copy. In some implementations, the metadata includes an index to a set of cache block patterns. In some implementations, identifying the cache block pattern based on the metadata of the cache block includes searching for the cache block pattern in a set of cache block patterns based on the metadata. In some implementations, the cache block pattern includes at least one symbol corresponding to at least one byte of the byte dictionary. In some implementations, the compressed cache block includes byte values. In some implementations, the byte dictionary of the cache block includes particular byte values of the uncompressed cache block.

Some implementations provide methods, systems, and devices for generating hardware configured for pattern-based cache block compression. A cache trace is input and a set of cache block patterns is determined based on the cache trace. A subset of cache block patterns is determined from the set of cache block patterns based on a set of compressed sizes and a target number of patterns for each size. A hardware description is output based on the determined subset of cache block patterns.

In some implementations, the set of cache block patterns is ranked based on frequency of occurrence in the cache trace to generate a set of ranked cache block patterns. In some implementations, the ranked cache block patterns are reduced by removing patterns occurring in the cache trace below a threshold frequency to generate a set of thresholded cache block patterns. In some implementations, cache block patterns that are not maximally inclusive are removed from the thresholded cache block patterns to generate a set of locally maximal cache block patterns. In some implementations, relatively maximal patterns of the set of locally maximal cache block patterns are combined to generate a set of absolutely maximal cache block patterns. In some implementations, subsets of the set of absolutely maximal cache block patterns are iteratively sorted based on which of the set of absolutely maximal cache block patterns describe more cache blocks to determine the subset of cache block patterns.

FIG. 1 is a block diagram of an example device 100 in which one or more features of the disclosure can be implemented. The device 100 can include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache. In some implementations, processor 102 includes a GPU implemented as an accelerator, and a CPU configured to manage input/output tasks for the GPU.

The storage 106 includes a fixed or removable storage, for example, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm performs the functionality described herein.

Figure 2:
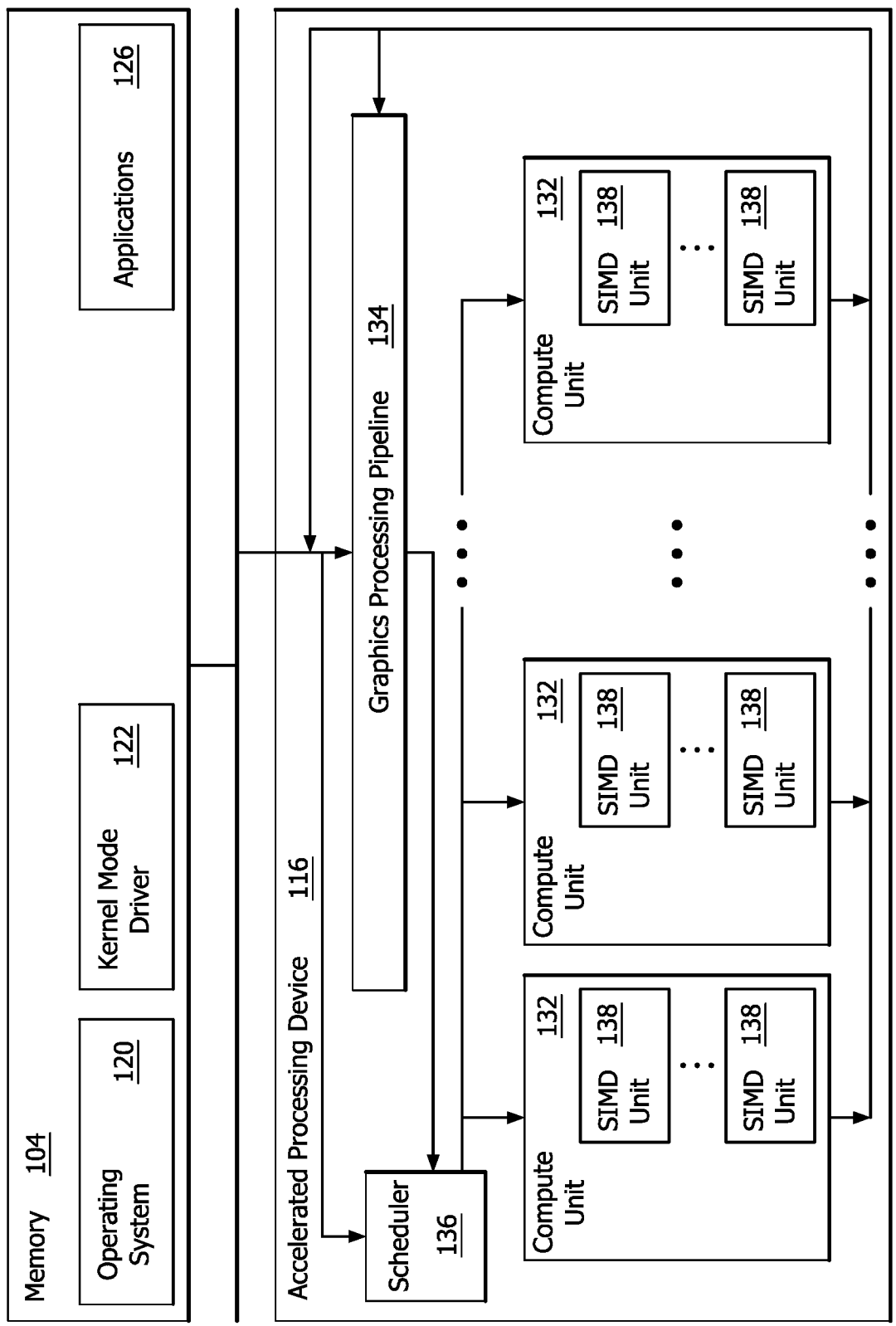
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Cache-block compression (or more generally, data block compression) underlies cache, memory, and link compression schemes. By compressing the information in a fixed-size cache block into a smaller representation (e.g., compressing a 64-byte block to 32 bytes), cache block compression effectively increases link bandwidth and the capacity of caches and memory, depending on implementation. In some implementations, cache-block compression enables significant improvements in system performance and energy efficiency. Techniques for cache block compression are typically applicable to compression of other, non-cache blocks of data. Accordingly, cache block compression applied to non-cache use cases is referred to as data block compression. Techniques and examples are discussed herein with respect to cache blocks and cache block compression, however it is noted that these techniques and examples are also applicable generally to data block compression.

Cache block compression techniques involving byte selection, are referred to as "Byte Select Compression" (BSC) herein. Example BSC techniques are discussed in U.S. Patent Application US 2020/0133866 A1 to Das, et al., the contents of which is hereby incorporated by reference in its entirety as if fully set forth herein. During compression, byte selection refers to selecting which bytes of the cache block to store and where to store the selected bytes. In this context, compression can be described as byte deduplication. During decompression, byte selection refers to the movement of the stored bytes from the compressed cache block back into their original order within the uncompressed (i.e., decompressed) cache block.

The examples herein illustrate techniques for compressing and decompressing a cache block based on a set of patterns, and techniques for generating the set of patterns for use in compressing and decompressing the cache block. Hardware for performing compression and decompression according to these techniques is derivable based on the set of patterns.

While cache block compression algorithms have been proposed, prior designs are typically based on the application of an ad hoc selection of common patterns observed in data by the designers. Accordingly, some implementations provide a search strategy to identify cache block patterns which yield compression algorithms exhibiting performance closer to ideal (e.g., performance closer to algorithms which would find and compress every pattern that can be described within the bounds of the compressed output size) than current compression approaches, while also incurring lower hardware overhead than the current compression approaches.

Techniques for compressing and decompressing the cache block based on patterns are discussed primarily with respect to FIGS. 3, 4, 5, and 6, and techniques for generating the set of patterns and corresponding hardware for performing the compression and decompression are discussed primarily with respect to FIGS. 7, 8, 9, 10, 11, and 12. Relative performance of BSC compression is discussed primarily with respect to FIG. 13.

Figure 3:
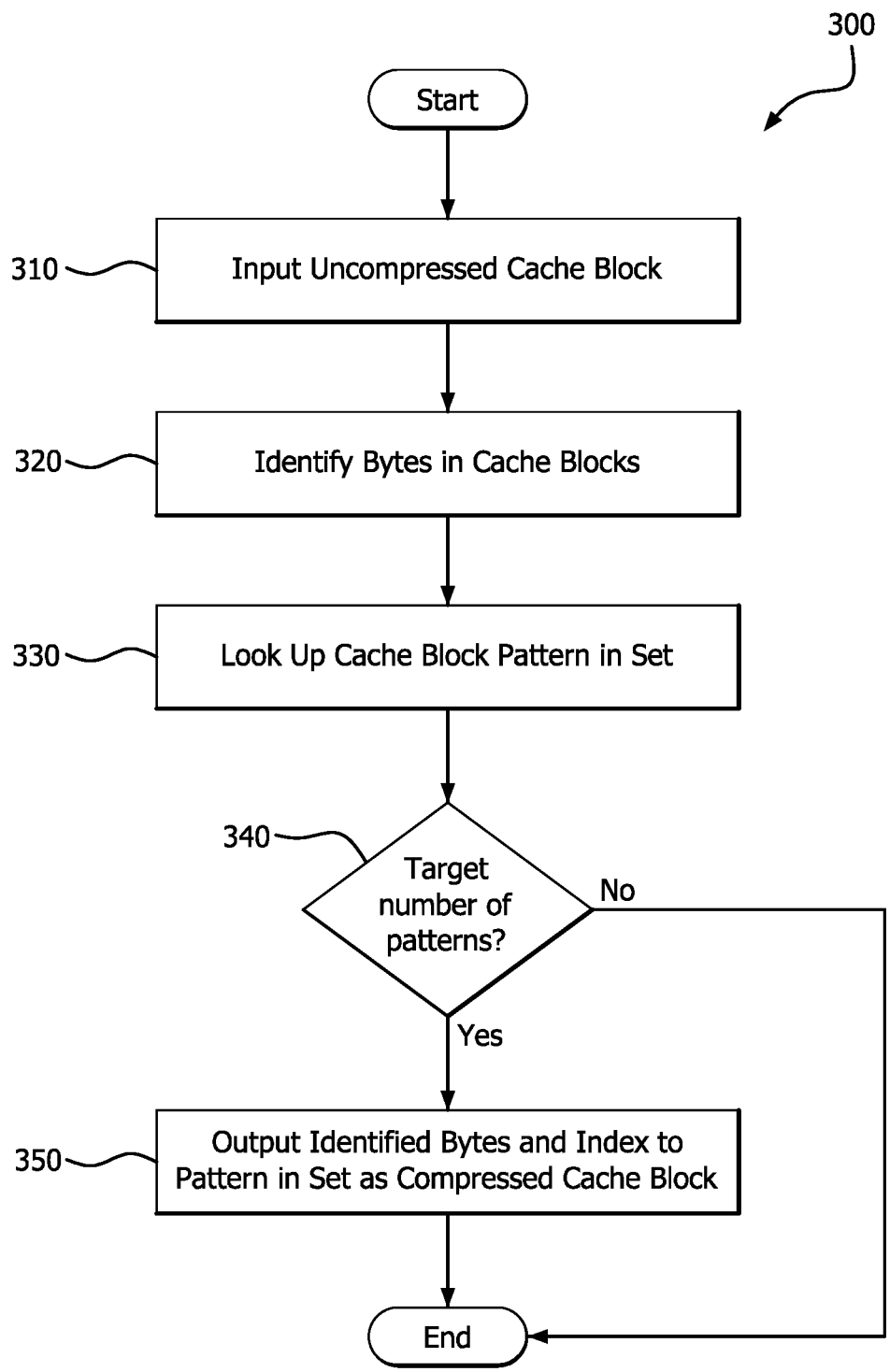
FIG. 3 is a flow chart illustrating an example process for compressing an uncompressed cache block.

FIG. 3 is a flow chart illustrating an example process 300 for compressing an uncompressed cache block based on patterns, using BSC.

In step 310, an uncompressed cache block is input to a suitable compressor. The compressor is implemented using any suitable compression circuitry and in any suitable manner, such as entirely in hardware, or as a combination of hardware and software or firmware. In some implementations, the uncompressed cache block is input to input buffers of the compressor. An example uncompressed 12 byte cache block includes 12 bytes of information, expressed in hexadecimal format in Table 1.

TABLE 1

| FF | FF | FF | 14 | FF | FF | FF | 18 | FF | FF | FF | 1C |

In step 320, particular byte values within the uncompressed cache block are identified, e.g., using suitable comparator logic of the compression circuitry. For example, in some implementations comparators are used to detect duplicate bytes within the uncompressed cache block. Particular byte values within the example uncompressed cache block of Table 1 are shown in Table 2.

TABLE 2

| FF | 14 | 18 | 1C |

The term "particular byte values", in this context, refers to byte values that appear at least once in the uncompressed cache block. For example, the particular byte value "FF" appears nine times in the example 12 byte cache block shown in Table 1, whereas the particular byte value "1C"

appears once. The byte value "00" does not appear in the example uncompressed 12 byte cache block shown in Table 1, and accordingly, is not a particular byte value of the uncompressed cache block and is not included in Table 2. Because the uncompressed cache block of Table 1 is expressible in terms of the particular byte values of Table 2, these particular byte values are referred to as a "byte dictionary" in this context.

In step 330, the pattern of particular byte values within the uncompressed cache block is looked up in a set of cache block patterns. The set of cache block patterns is storable in any suitable manner, such as in a table, matrix, or vector within a memory, such as a register file. In some implementations, the pattern is "looked up" or indexed, e.g., based on outputs of the comparators. For example, to look up the pattern, the particular byte values can be expressed and referenced using a symbol rather than the full byte. Example symbols for each particular byte value in the byte dictionary are shown, in decimal, in Table 3. Because there are four particular byte values in this example byte dictionary, each symbol can be expressed using a minimum of two bits. It is noted that these particular symbols are exemplary, and any suitable symbols are usable in other implementations. Processes for representation of the particular byte values in the byte dictionary using symbols are discussed further herein.

TABLE 3

| 0 | 1 | 2 | 3 |
| --- | --- | --- | --- |

Based on the symbols of Table 3, the pattern of bytes in the example cache block shown in Table 1 is expressible as shown in Table 4.

TABLE 4

| 0 | 0 | 0 | 1 | 0 | 0 | 0 | 2 | 0 | 0 | 0 | 3 |
| --- | --- | --- | --- | --- | --- | --- | --- | --- | --- | --- | --- |

Generation of the cache block pattern in terms of symbols in this way is an intermediate step in looking up the cache block pattern in some implementations. It is noted that the pattern of particular byte values present in the example uncompressed cache block shown in Table 1 can be expressed in other ways. Determination of such pattern expression, and determination of the set of cache block patterns, is discussed further herein.

On a condition 340 that the cache block pattern as shown in Table 4 is not found in the set of cache block patterns, process 300 ends, and the example uncompressed cache block shown in Table 1 is not compressed, or is compressed using other techniques. On condition 340 that the pattern as shown in Table 4 is found in the set of cache block patterns, a compressed cache block is output in step 350 based on the index to the cache block pattern in the set of cache block patterns and the byte dictionary. In some implementations, the compressed cache block includes the byte dictionary, e.g., as shown in Table 2, and metadata, which includes the index to the cache block pattern in the set. The compressed cache block is storable in a cache or transmissible over a link, for example. Table 5 illustrates the example compressed cache block.

TABLE 5

| Metadata | FF | 14 | 18 | 1C |
| --- | --- | --- | --- | --- |

In some implementations, metadata also includes a bit indicating whether the cache line is compressed.

Figure 4:
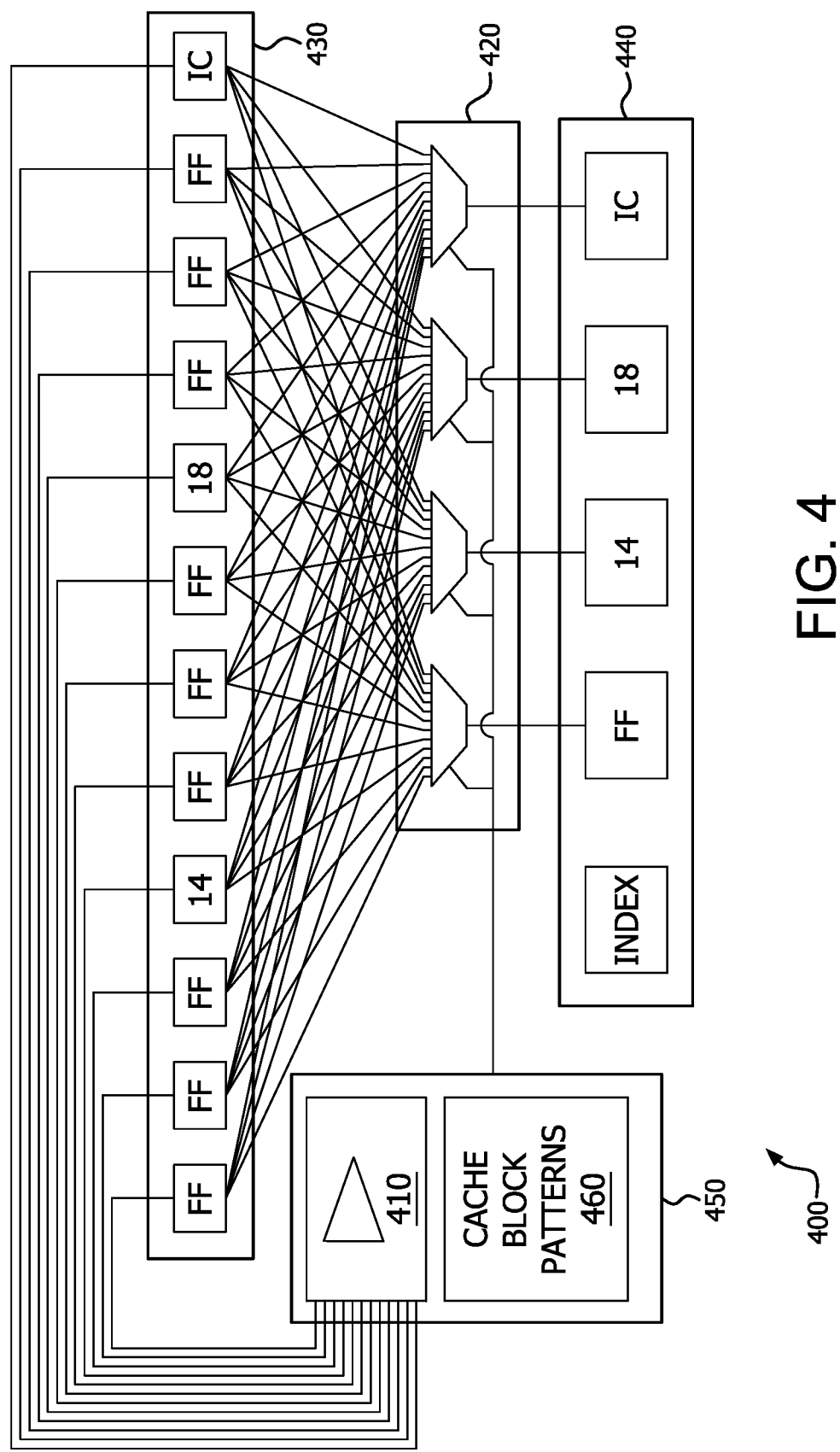
FIG. 4 is a schematic diagram illustrating example compression circuitry.

FIG. 4 is a schematic diagram illustrating example compression circuitry 400 for compressing an uncompressed cache block based on patterns, using BSC. Example compression circuitry 400 is usable, for example, to implement the process shown and described with respect to FIG. 3. It is noted that example compression circuitry 400 is merely illustrative, and any suitable configuration of hardware and/or software is capable of generating a compressed cache block based on patterns, using BSC, is usable in other implementations.

Compression circuitry 400 includes logic 450, which includes comparator circuitry 410 and stored cache block patterns 460, multiplexer circuitry 420, memory cells 430 holding the uncompressed cache block, and memory cells 440 for holding a compressed cache block including a byte dictionary and metadata.

In operation, an uncompressed cache block is stored in memory cells 430 of compression circuitry 400. This corresponds to step 310 as shown and described with respect to FIG. 3. Memory cells 430 include cache block storage within a cache, or any other suitable buffers or other storage circuitry. In this example, the uncompressed cache block corresponds to the example 12 byte cache block shown and described with respect to Table 1.

Bytes of the uncompressed cache block are compared with each other by comparator circuitry 410 to identify a pattern of particular byte values within the cache block. This corresponds to step 320 as shown and described with respect to FIG. 3. Comparator circuitry 410 is a part of, or in communication with, logic circuitry 450 in some implementations. In this example, the particular byte values within the example cache block correspond to the example bytes shown and described with respect to Table 2. The pattern is identifiable symbolically, e.g., as shown and described with respect to Table 4.

The pattern of particular byte values within the uncompressed cache block is looked up in a cache block pattern set 460. This corresponds to step 330 as shown and described with respect to FIG. 3. The cache block pattern is compared with the cache block pattern set 460 using any suitable logic, e.g., within logic circuitry 450 and/or comparator circuitry 410. In some implementations, the cache pattern set 460 is expressed in symbols, and the cache block pattern is converted to symbols as an intermediate step, e.g., as discussed regarding step 330 with respect to FIG. 3.

If the cache block pattern is not matched with a corresponding pattern in cache block pattern set 460, the uncompressed cache block is not compressed, or is compressed using other techniques. If the cache block pattern is matched with a corresponding pattern in cache block pattern set 460, logic circuitry 450 sets multiplexer circuitry 420 (e.g., by setting select lines) to store the particular byte values to memory cells 440 as a byte dictionary of a compressed cache block corresponding to the uncompressed cache block, and encodes and stores an index to the cache block pattern within cache block pattern set 460 to memory cells 440 as metadata of the compressed cache block. This corresponds to condition 340 and step 350 as shown and described with respect to FIG. 3. In this example, the compressed cache block includes the byte dictionary and metadata, where the metadata includes the index to the cache block pattern set 460. In some implementations, the metadata includes other information, as discussed further herein.

Figure 5:
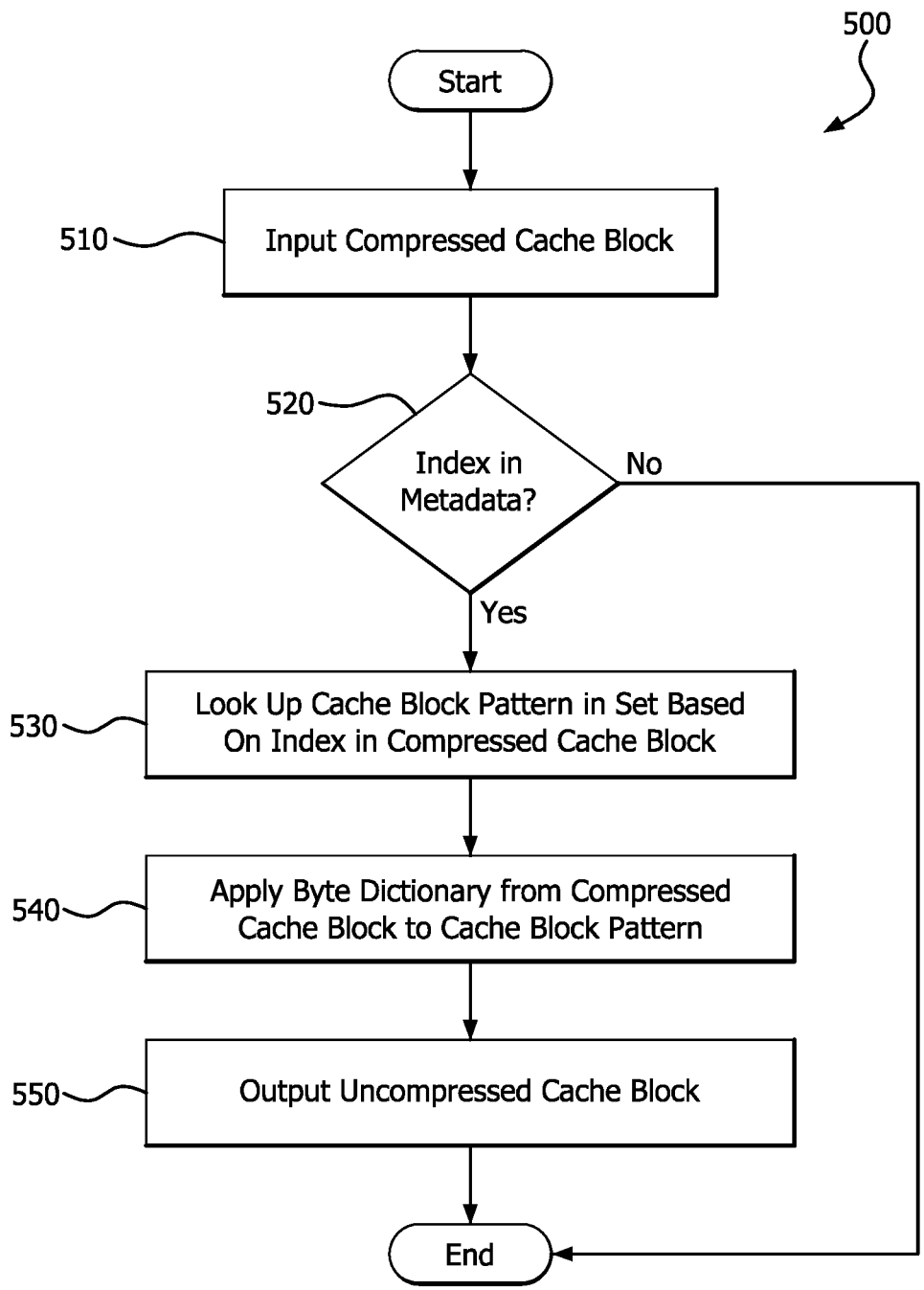
FIG. 5 is a flow chart illustrating an example process for decompressing a compressed cache block.

FIG. 5 is a flow chart illustrating an example process 500 for decompressing a compressed cache block based on patterns, using BSC.

In step 510, a compressed cache block is input to a suitable decompressor. The decompressor is implemented using any suitable decompression circuitry and in any suitable manner, such as entirely in hardware, or as a combination of hardware and software or firmware. In some implementations, the compressed cache block is input to buffers of the decompressor. An example compressed cache block is illustrated in Table 5 above. In some implementations, the compressed cache block is generated based on the process and/or circuitry shown and described with respect to FIG. 3 and/or FIG. 4 respectively.

On condition 520 that metadata of the compressed cache block does not include an index to a set of cache block patterns, the cache block is not decompressed using process 500, and the process ends. If the metadata does include an index to the set of cache block patterns, the cache block pattern is looked up in the set based on the index in step 530. The cache block pattern corresponds to Table 4 in this example. In this example, it is assumed that the cache block pattern is included in the cache block pattern set if an index is present in the metadata.

In step 540, the byte dictionary from the compressed block, which corresponds to Table 2 in this example, is applied to the cache block pattern (e.g., based on the symbol mapping of Table 3) to generate the uncompressed cache block (shown in Table 1 in this example), and the uncompressed cache block is output in step 550. The uncompressed cache block is storable in a register of a CPU, or any other suitable storage location.

Figure 6:
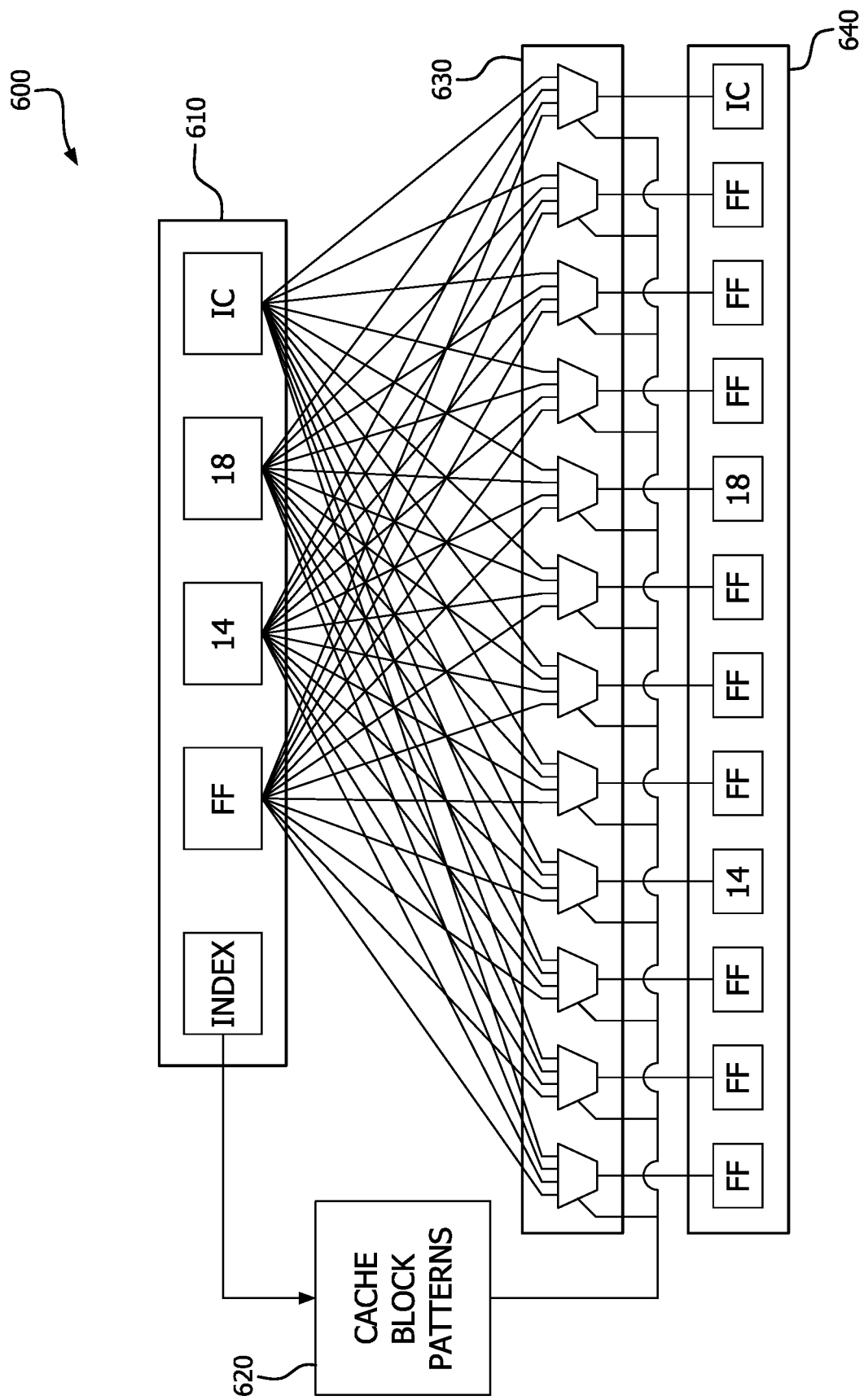
FIG. 6 is a schematic diagram illustrating example decompression circuitry.

FIG. 6 is a schematic diagram illustrating example decompression circuitry 600 for decompressing a compressed cache block based on patterns, using BSC. Example decompression circuitry 600 is usable, for example, to implement the process shown and described with respect to FIG. 5. It is noted that example decompression circuitry 600 is merely illustrative, and any suitable configuration of hardware and/or software is capable of generating a decompressed cache block based on patterns, using BSC, is usable in other implementations.

Decompression circuitry 600 includes memory cells 610 configured to input the particular byte values from a byte dictionary of a compressed cache block. This corresponds to step 510 as shown and described with respect to FIG. 5. Memory cells 610 include cache block storage within a cache, or any other suitable buffers or other storage circuitry. In this example, the compressed cache block corresponds to the example compressed cache block is illustrated in Table 5 above. Decompression circuitry 600 also includes logic circuitry 620 configured to input metadata from the compressed cache block in memory cells 610 and to identify a cache block pattern within a set of stored cache block patterns based on an index included in the metadata. This corresponds to condition 520 and step 530 as shown and described with respect to FIG. 5. If the metadata does not include an index to the set of cache block patterns, the compressed cache block is not decompressed using the decompression circuitry 600.

Otherwise, if the metadata does include an index to the set of cache block patterns, the cache block pattern is identified within the cache block pattern set by logic circuitry 620. The logic circuitry 620 sets the select lines of multiplexers 630 based on the identified cache block pattern, such that multiplexers 630 map the byte dictionary of the compressed cache block to memory cells 640 corresponding to the uncompressed cache block. This corresponds to steps 540 and 550 as shown and described with respect to FIG. 5. The uncompressed cache block is storable in a register of a CPU, or any other suitable storage location.

In some implementations, such as shown and described with respect to FIG. 5, a BSC compressor (including the cache block pattern sets) is implemented with comparators (e.g., to detect duplicate bytes), multiplexers (e.g., to route bytes to and from the byte dictionary, and logic (e.g., to encode and decode metadata). In some implementations, such as shown and described with respect to FIG. 6, a BSC decompressor (including the cache block pattern sets) is implemented with multiplexers where the byte dictionary of the compressed cache block is input to the inputs of the multiplexers and where the multiplexer selector values are derived from the metadata of the compressed cache block. In some implementations, limiting implementation of the compressor and/or decompressor primarily to comparators and multiplexers has the advantage of limiting the complexity of the algorithms, and limiting area, and/or latency of the corresponding hardware.

In some implementations, the area complexity of BSC compression and decompression hardware is determined by the number of inputs to the byte multiplexers, and the complexity of the logic for generating and processing metadata. In some implementations, the latency is determined by the maximum number of inputs to any mux and the depth of the metadata logic. In some implementations, the size and content of the cache block pattern set has an impact on the performance of the BSC compression and/or decompression in terms of speed and die area.

Accordingly, some implementations provide techniques for generating the set of patterns and corresponding hardware for performing the compression and decompression. As illustrated by the example processes and circuitry described with respect to FIGS. 3, 4, 5, and 6, a cache block pattern is representable as a string of symbols, one per byte in the cache block, which expresses the pattern of byte values in the cache block. A cache block is describable by a specific cache block pattern if bytes of the cache block having the same value are represented by the same symbol in the cache block pattern. For example, the example cache block listed in Table 1 is describable by the cache block pattern listed in Table 4 because each of the bytes in Table 1 having the same value is represented by the same symbol in Table 4.

The cache block pattern functions as a string of indices to a byte dictionary. An uncompressed cache block is describable by a specific cache block pattern if it is possible to create a byte dictionary from the uncompressed cache block where the indices of the specific cache block pattern are usable to decompress the byte dictionary to the uncompressed cache block.

As illustrated with respect to FIGS. 3, 4, 5, and 6, a cache block pattern is used to de-duplicate bytes of an uncompressed cache block in order to yield a compressed cache block which includes a byte dictionary and metadata. The metadata includes an index to a set of cache block patterns from which the uncompressed cache block can be reconstructed.

Figure 7:
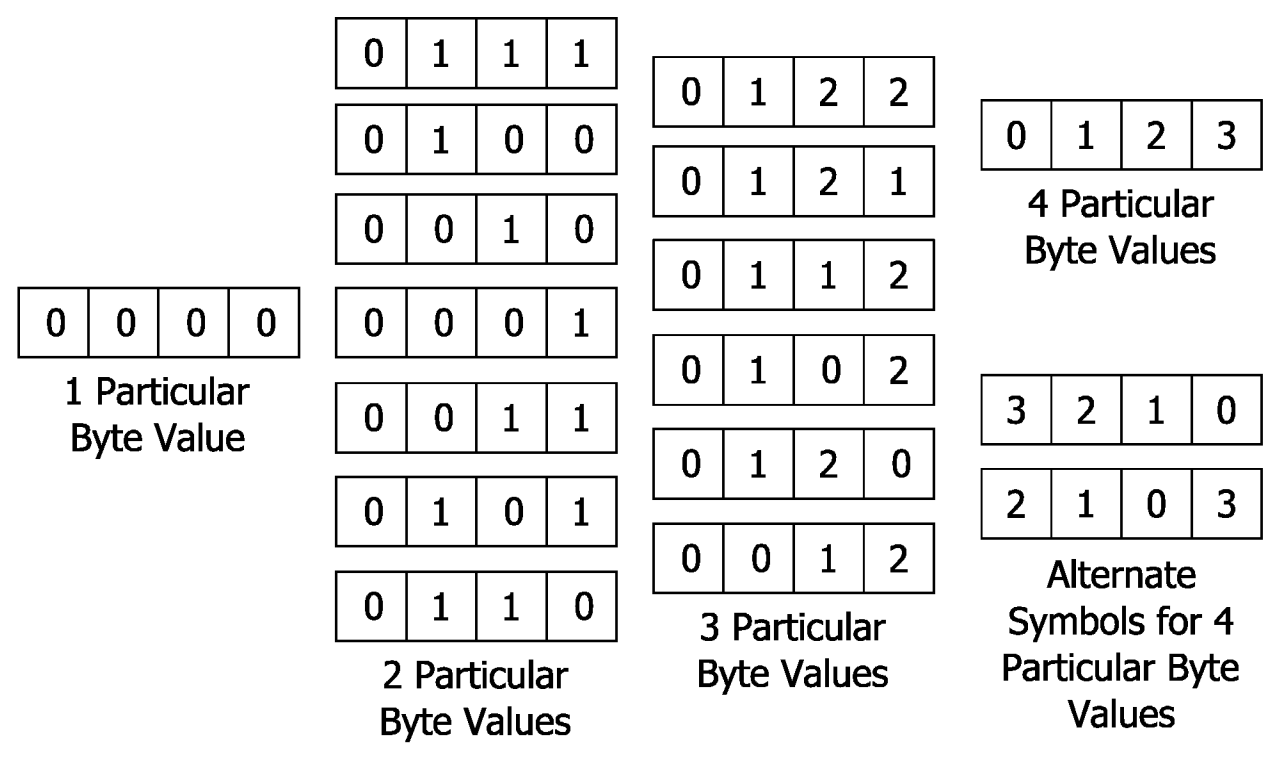

FIG. 7 is a block diagram illustrating a set of example cache block patterns for an example 4-byte cache block. As shown in FIG. 7, a 4-byte cache block having one particular byte value repeated in each of the four bytes of the cache block is representable using one symbol (0, in this example set of cache block patterns). It is noted that the set shown is not exhaustive for such cache blocks. For example, any available symbol could be used to represent the one particular byte value in other examples.

As also shown in FIG. 7, a 4-byte cache block which includes two particular byte values is representable using two symbols, in an order which depends on their position within the cache block. Several cache block patterns for cache blocks that include two particular cache byte values are shown in FIG. 7. It is noted that the set shown is not exhaustive for such cache blocks. A cache block pattern which has two symbols is also capable of representing a cache block which includes one particular byte value, as further discussed with respect to FIG. 8.

As further shown in FIG. 7, a 4-byte cache block which includes three particular byte values is representable using three symbols, in an order which depends on their position within the cache block. Several cache block patterns for cache blocks that include three particular cache byte values are shown in FIG. 7. It is noted that the set shown is not exhaustive for such cache blocks. A cache block pattern which has three symbols is also capable of representing a cache block which includes one particular byte value, or two particular byte values, as further discussed with respect to FIG. 8.

As further shown in FIG. 7, a 4-byte cache block which includes four particular byte values is representable using four symbols. Because each byte in the cache block includes a different particular byte value in this example, the order of the symbols does not matter. Accordingly, an example cache block pattern for cache blocks that include four particular cache byte values is shown in FIG. 7. It is noted that the example cache block pattern shown is not exhaustive for such cache blocks. However other cache block patterns usable to represent such cache blocks would be equivalent, and accordingly, redundant. Alternate permutations of symbols to represent that each byte in the cache block includes a different particular byte value are provided in FIG. 7 simply for the sake of example. A cache block pattern which has four symbols is also capable of representing a cache block which includes one particular byte value, two particular byte values, or three particular byte values, as further discussed with respect to FIG. 8.

The example cache block patterns included in the example cache block pattern set shown in FIG. 7 are not exhaustive. For example, in the case where the 4-byte cache block includes four particular byte values, the symbols 0, 1, 2, 3 are usable in any order to represent the bytes, or different symbols are usable. This is also true for the one-, two-, and three-particular byte value cases illustrated in FIG. 7.

Figure 8:
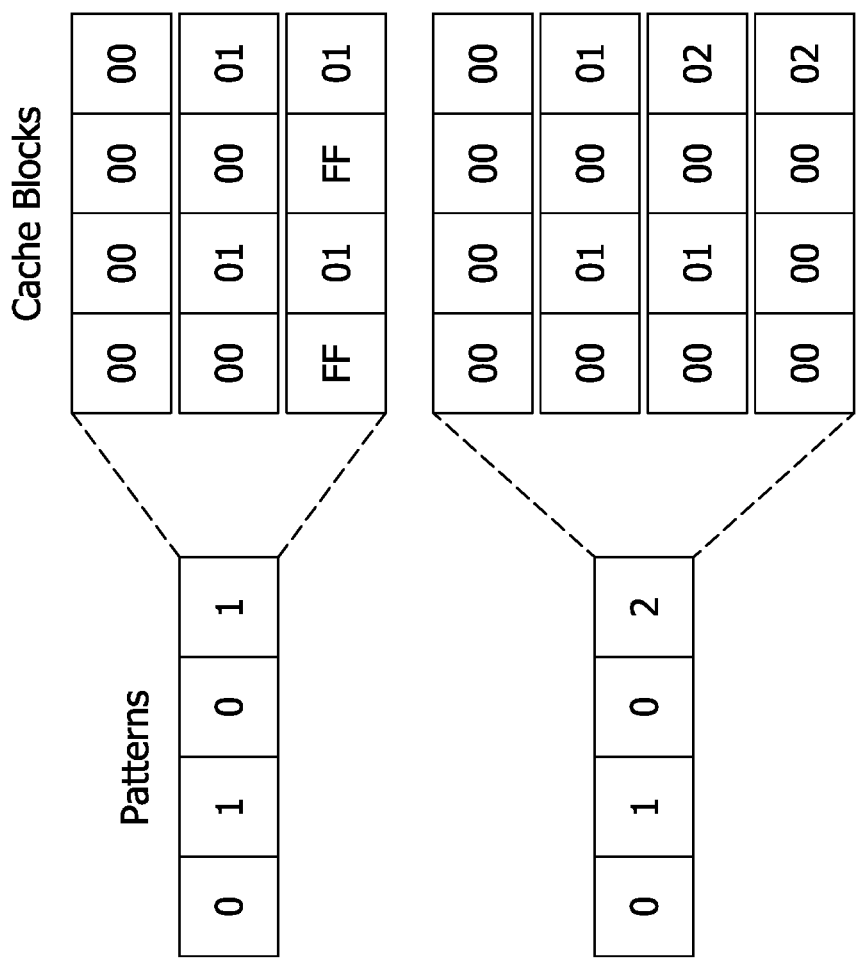
FIG. 8 is a block diagram illustrating example cache block values represented by particular cache block patterns.

FIG. 8 is a block diagram illustrating example cache block patterns for an example 4-byte cache block alongside example cache block values that are describable using these example cache block patterns. The examples in FIG. 8 illustrate ways in which a few patterns are usable to describe many cache blocks.

As shown in FIG. 8, the cache block pattern 0 1 0 1 describes a cache block having byte values of FF 01 FF 01 if the symbol "0" is mapped to the value "FF" and the symbol "1" is mapped to the value "01". Similarly, this cache block pattern is also usable to describe a cache block having byte values of 00 01 00 01 if the symbol "0" is mapped to the value "00" and the symbol "1" is mapped to the value "01". This cache block pattern also describes a cache block having byte values of 00 00 00 00 if the symbol "0" is mapped to the value "00" and the symbol "1" is also mapped to the value "00". In each of these cases, the example cache block is described by the cache block pattern 0 1 0 1 because each of the particular byte values in the example cache block having the same value is represented by the same symbol in the cache block pattern.

As similarly shown in FIG. 8, the cache block pattern 0 1 0 2 describes a cache block having byte values of 00 01 00 02 if the symbol "0" is mapped to the value "00", the symbol "1" is mapped to the value "01", and the symbol "2" is mapped to the value "02". This example illustrates the cache block pattern 0 1 0 2 representing a cache block having three particular byte values. Similarly, cache block pattern 0 1 0 2 also describes a cache block having byte values of 00 01 00 01 if the symbol "0" is mapped to the value "00", the symbol "1" is mapped to the value "01", and the symbol "2" is also mapped to the value "01". This example illustrates the cache block pattern 0 1 0 2 representing a cache block having two particular byte values. Cache block pattern 0 1 0 2 also describes a cache block having byte values of 00 00 00 02 if the symbol "0" is mapped to the value "00", the symbol "1" is mapped to the value "00", and the symbol "2" is also mapped to the value "02". This example illustrates a second example of the cache block pattern 0 1 0 2 representing a cache block having two particular byte values, where the particular cache blocks are in a different arrangement.

Cache block pattern 0 1 0 2 also describes a cache block having byte values of 00 00 00 00 if the symbol "0" is mapped to the value "00", the symbol "1" is also mapped to the value "00", and the symbol "2" is also mapped to the value "00". This example illustrates the cache block pattern 0 1 0 2 representing a cache block having one particular byte value. In each of these cases, the example cache block is described by the cache block pattern 0 1 0 2 because a symbol in the cache block pattern indicates a particular byte value in each position it occurs, and different symbols are usable to represent the same particular byte value in some cases.

As demonstrated by the examples in FIG. 8, a few patterns are usable to describe many cache blocks. For example, any cache block with all matching bytes, including the 'all zeros' cache block, is describable by any pattern.

Because each pattern is usable to describe the values of a number of different cache blocks, a subset of all possible patterns is usable to describe all possible cache blocks. The number of cache blocks is also further reducible if patterns are removed from the subset.

An ideal BSC compression and/or decompression algorithm would include every possible non-equivalent pattern in the set of cache block patterns (i.e., an exhaustive list of possible symbolic representations of the bytes in the uncompressed cache block). However, metadata for indexing a cache block pattern set that includes every possible pattern would potentially be too large to result in a compressed block that is smaller (or sufficiently smaller) than the uncompressed cache block.

Accordingly, some implementations include methods, devices, and systems for selecting a subset of all possible cache block patterns (e.g., in order to limit the metadata and/or hardware complexity required for BSC compression and decompression) which still yields a desired level of performance.

In some implementations, a subset of all possible cache block patterns is developed such that it best achieves constraints selected to compress cache blocks to a desired set of target sizes (i.e., quantized compression ratios) for at or below a desired threshold cost (e.g., in terms of latency and/or energy consumption).

It is noted that the set of all cache block patterns is not the same as the set of all n-byte strings made up of the numbers zero through n−1. This is because many patterns are equivalent in terms of the sets of cache blocks that they can describe. Any patterns that differ only by the names of the symbols they use are equivalent.

Consider the following 4-byte patterns for example: 0101, 1010, and 1313. The patterns (and many others) all describe the same set of cache blocks where the first and third bytes match and the second and fourth bytes match. Accordingly, rather than selecting a subset of all possible pattern length strings, in some implementations the subset is selected from a subset of all unique sets of describable cache blocks, one pattern for each set.

In some implementations, the number of patterns considered is constrained in order to keep the implementing hardware area and latency cost at or below a threshold (i.e., to constrain area and/or latency) e.g., when using relatively large byte dictionary sizes. For example, in some implementations, limiting the number of patterns considered limits the number of comparators in the compressor and complexity of the selector computation logic in both the compressor and decompressor.

Accordingly, the constraints on the pattern search are a set of compressed sizes, d, and a target number of patterns, n, for each size. In some implementations, the only metadata needed to decompress the compressed cache block is a pattern index. In such cases, $\lceil \log_2(n) \rceil$ bits of metadata are required where n is the target number of patterns. In some implementations, the metadata required for each target compressed size is subtracted to yield a set of byte dictionary size constraints. In some implementations, the target size is independent of interactions between patterns for different target sizes. In some implementations, the pattern search constraints constrain the choice of a set of patterns to the best n, from the set of all possible patterns, for a byte dictionary size no greater than p.

Given the pattern-based compression and decompression techniques discussed above, in some implementations it is desired to choose a set of patterns that meets certain goals, which are conflicting in some cases. This task is referred to as the pattern search problem. One example goal is to develop a set of patterns that is large enough to achieve a desired (i.e., suitably high) quantized compression ratio. Said another way, in some implementations, the set of patterns is developed such that it describes a desired (e.g., suitably large) fraction of blocks, e.g., for a desired set of workloads (e.g., in a generic set of workloads, for a training set of workloads, for most workloads, etc.) Another example goal is to develop a set of patterns that is small enough to a achieve a desired (i.e., suitably limited and/or suitably low) metadata size.

In some implementations, the compressed representation requires $\lceil \log_2(n) \rceil$ bits of metadata to sufficiently describe n patterns. Accordingly, in some implementations, larger numbers of patterns will tend to reduce the number of bytes available for the byte dictionary as metadata increasingly takes up space in the compressed representation. Further, larger numbers of patterns will increase the area and latency overheads for the compression and decompression logic circuitry. On the other hand, in some implementations, fewer patterns require fewer comparators, a smaller priority encoder in the compressor, and fewer inputs to the multiplexors in the compressor and decompressor.

Another example goal is to select the patterns based on the available compressed output sizes. As noted above, compressing to fewer bytes than a quantized output size provides no benefit unless it compresses to a still smaller quantized size output size. Accordingly, in some implementations, a set of compressed output sizes is input, and a set of patterns is identified for each size.

In some implementations, development of the cache block pattern set does not consider interaction between patterns for different target sizes. In some implementations (e.g., for simplicity) the multi-target-size problem is decomposed into a separate search problem for each quantized output size. In some implementations, encoding techniques are used to differentiate the different sizes in the metadata, e.g., by encoding each target output size with a unique symbol. Accordingly, in some implementations, the core search problem is stated as: from the set of all possible patterns, pick the best p patterns with byte dictionary size no greater than n.

Figure 9:
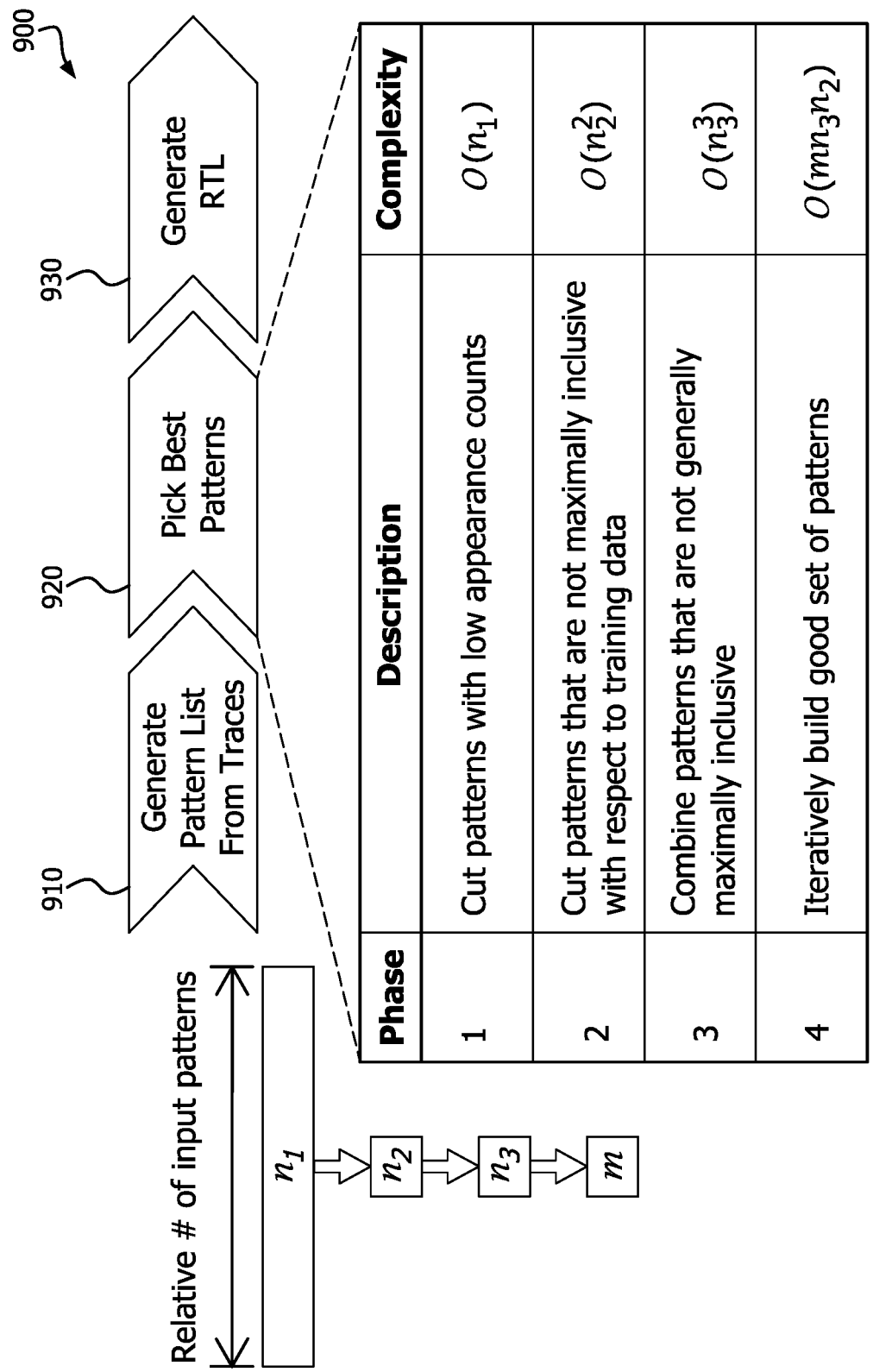
FIG. 9 is a flow chart which illustrates an example process for generating compressors and/or decompressors.

FIG. 9 is a flow chart which illustrates an example process 900 for generating BSC compressors and/or decompressors. Process 900 includes a process for selecting a subset of all possible cache block patterns. The process for selecting a suitable subset of all possible cache block patterns addresses the pattern search problem discussed above. Process 900 also generates a hardware description for a suitable compressor and/or decompressor based on the subset. In general, after a ranked set of the cache block patterns is determined, e.g., using associated counters, the ranked set of cache block patterns is reduced to generate a subset of these patterns. For example, in some implementations, the best p patterns (e.g., where p is the target number of patterns derived from a target compressed cache block size, as discussed earlier) that require no more than n bytes for decompression.

In more detail, in step 910, a training program is executed using the cache or a model of the cache (e.g., either in hardware or in simulation) and traces (e.g., logs) of the cache blocks which occur during execution of the training program are captured. In some implementations, the training program is representative of programs to be run after the training. In some implementations, a training program is representative of programs to be run after the training if patterns appear in the same or similar (e.g., within a threshold degree or percentage similarity) proportion in the training program and the target future programs. Cache block patterns which appear in the traces are identified and ranked based on the training traces to generate a ranked list of all cache block patterns. In some implementations, the cache block patterns are ranked based on a count of how many of the cache blocks which appear in the training traces are represented by each pattern.

In step 920, the ranked set of cache block patterns is reduced based on different characteristics, e.g., in four phases as discussed below, to generate a reduced set of cache block patterns. In step 930, a register transfer language (RTL) or other suitable representation of compression and decompression hardware is generated based on the reduced set of cache block patterns.

Example implementations of steps 910, 920, and 930 are discussed in more detail as follows. In step 910, pattern counts used to generate the ranked set of cache block patterns are derived from the training traces. This process is referred to as trace processing. In some implementations, to derive the pattern counts, patterns occurring in the trace are identified. A straightforward approach to deriving the pattern counts would be to determine, for each cache block pattern in the list of all possible cache block patterns for a given cache block size, how many of the cache blocks which occurred in the trace (i.e., passed through the cache during execution of the training program) are describable by that pattern. However, the number of all possible patterns is prohibitively large in some implementations, and a cache block is describable by multiple patterns. Thus, directly counting patterns in this way would both be computationally expensive and would lose some useful information about which patterns share which blocks in some implementations. For example, if two patterns are capable of describing some (but not all) of the same cache blocks in the training trace, by counting both patterns, it becomes impossible to know how many cache blocks were counted by both patterns versus how many blocks were counted by only one of the patterns. This may be disadvantageous in implementations where it is desired to decide which of the two patterns represents more patterns (e.g., to eliminate the other for efficiency).

Accordingly, in some implementations, for each pattern that appears in the trace, the number of cache blocks for which the pattern is the simplest (i.e., includes the least number of symbols) pattern that can describe the cache block is determined. In some implementations, the simplest pattern for each cache block appearing in the trace is determined, and the number of times each of these patterns appears is counted. In some implementations, to determine the simplest pattern for a cache block, particular byte values in the cache block are placed into an array (or are otherwise indexed) in the order they appear in the cache block. After this, each byte value in the original cache block is replaced with its index in the array.

Figure 10:
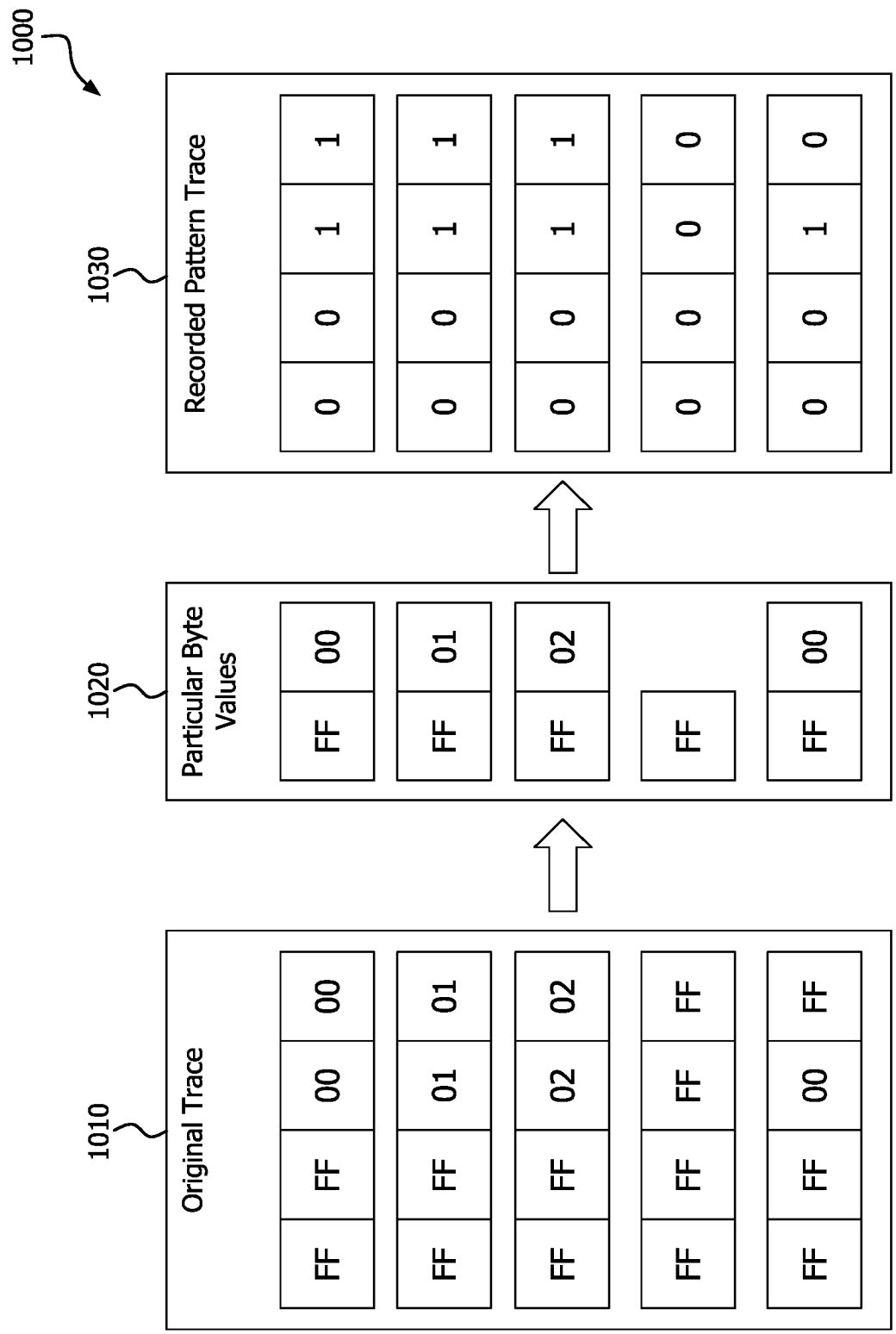
FIG. 10 is a flow chart illustrating an example process for determining a pattern trace from a training trace.

As an illustrative example of aspects of step 910, FIG. 10 is a flow chart illustrating an example process 1000 for determining a pattern trace from a training trace. The pattern trace is a list of patterns that describe the cache blocks which appear in the training trace. This pattern trace is usable to derive a pattern count for the training trace.

In step 1010, an example cache trace, which includes five uncompressed four-byte cache blocks, is captured based on an example training run. In step 1020, particular byte values of each of the five uncompressed four-byte cache blocks is placed into an array (or equivalently indexed) in the order in which they appear in the uncompressed cache block. In step 1030, a pattern is recorded for each of the five uncompressed four-byte cache blocks by replacing each particular byte value with its index in the array.

For example, the four-byte block FF FF 00 00 appears in the original trace captured in step 1010, and includes the particular byte values FF and 00. In step 1020, these particular byte values are placed into an array (or equivalently indexed), in the order in which they appear in the cache block, as FF 00, where FF is at index 0, and 00 is at index 1. In step 1030, in the recorded pattern trace, each occurrence of the byte value FF in the original trace is replaced with the index 0, and each occurrence of the byte value 00 in the original trace is replaced with the index 1. As shown in FIG. 10, example process 1000 is carried out for each of several four-byte blocks in the original trace to yield a corresponding recorded pattern trace.

After a pattern trace has been determined from the training trace, e.g., using a process consistent with example process 1000, a pattern count is determined. For example, although each of the example four-byte cache blocks in the original trace has a different value, one of the patterns in the recorded pattern trace (the pattern 0 0 1 1 in this example) is the simplest byte pattern representation for three of the cache blocks. Accordingly, this pattern has a count of 3, while the other two example patterns in the recorded pattern trace each have a count of 1.

After the pattern count is determined, returning to FIG. 9, the cache block pattern set is reduced in step 920. In some implementations, the cache block pattern set is reduced in a multi-phase process that successively cuts more patterns in each phase. Within example process 900, step 920 is a four-phased process. In some implementations, each phase has equal or greater algorithmic complexity than the previous phase. The first phase takes as input the patterns and counters (e.g., the ranked set of cache block patterns) generated in step 910. The final (e.g., fourth) phase outputs a sorted set of patterns from which the top p can be used to generate RTL in step 930.

In Phase 1, infrequent patterns are removed. In some implementations, any pattern that is the simplest describing pattern for less than a threshold number of cache blocks is removed in Phase 1. In some implementations, the threshold is set such that the later phases finish in an acceptable amount of time. A higher threshold yields fewer patterns for the later, more complex, phases to process. In some implementations, the threshold is set to provide regularization to the process. For example, a higher threshold may improve compression results of later phases, or may prevent or avoid scenarios where the input from this phase negatively impacts later phases. In some implementations, patterns are cut in this phase solely based on a heuristic that patterns appearing less often should be less useful (i.e., less likely to describe cache blocks seen after training, e.g., in target applications). In some implementations, the output from Phase 1 is of the same format as the input to Phase 1; e.g., a list of cache block patterns that was not cut in Phase 1, which includes a corresponding count of for how many cache blocks in the trace that pattern is the simplest describing pattern.

If the number of patterns input to Phase 1 is $n_1$, Phase 1 is describable as being of $O(n_1)$ complexity, where complexity represents the number of operations performed in this phase. Subsequent phases are described relative to this phase in terms of this function.

In Phase 2, cache blocks patterns that are not maximally inclusive (i.e., are "non-maximal" cache block patterns) with respect to the training trace are removed from the list of patterns output from Phase 1.

A cache block pattern is maximally inclusive (i.e., is "maximal") with respect to the training trace if the cache blocks in the recorded pattern trace which it describes are not a subset of the cache blocks describable by any other cache block patterns in the recorded pattern trace. In other words, a cache block pattern is maximal if no other cache block pattern in the recorded pattern trace describes the same cache blocks, as well as further cache blocks. A cache block pattern is non-maximal with respect to the training trace if the cache blocks describable by the cache block pattern are a subset of the cache blocks describable by another cache block pattern in the recorded pattern trace. In other words, a cache block pattern is non-maximal with respect to the training trace if another cache block pattern in the recorded pattern trace describes all of the same cache blocks, as well as further cache blocks in the trace.

Because we can say a pattern is less than another pattern if the set of cache blocks it describes is a subset of cache blocks described by another pattern in the recorded pattern trace, a partial ordering of the cache block patterns in the recorded pattern trace can be created based on the sets of cache blocks in the trace which they describe. This partial ordering of the cache block patterns can be expressed using a lattice of all possible cache block patterns for the cache block size. In this context, a partial ordering of the cache block patterns in the recorded pattern trace implies a partially ordered set; i.e., that for all patterns, the subset operation is reflexive, antisymmetric, and transitive. In a partial ordering, for some pairs of the cache block patterns, neither is a subset of the other, whereas in a total ordering, for any pair of the cache block patterns, one would compress a subset of the blocks compressed by the other.

Figure 11:
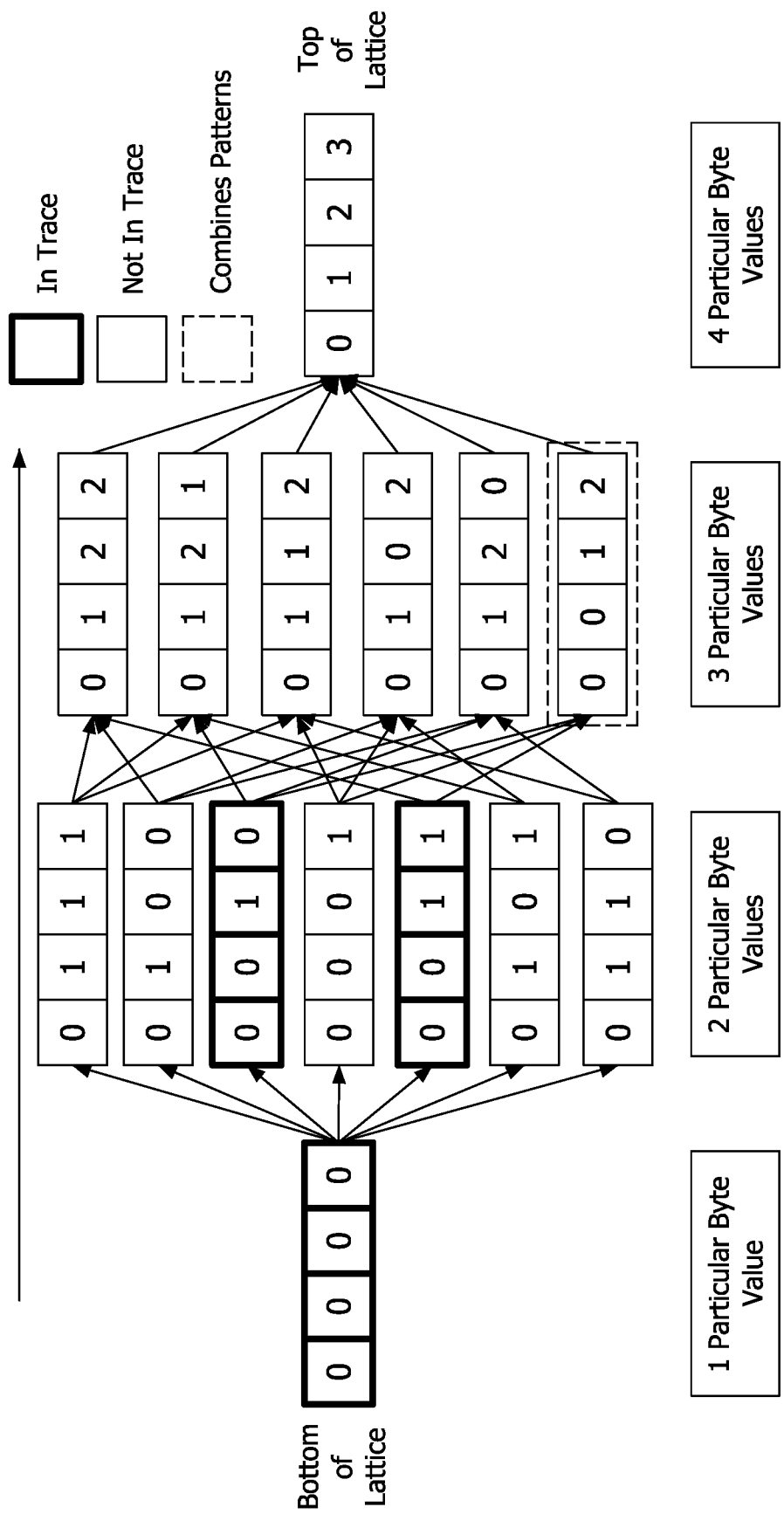
FIG. 11 is a lattice diagram illustrating example relationships among cache block patterns in an example set of cache block patterns.

FIG. 11 is a lattice diagram illustrating example relationships among cache block patterns in an example set of cache block patterns for 4-byte cache blocks.

In the lattice of FIG. 11, arrows connecting different patterns denote that a source pattern (at the root of the arrow) is less than a destination pattern (at the head of the arrow). The "bottom" of the lattice includes a pattern which describes a cache block that includes only one particular byte value. In this example, the bottom of the lattice describes a cache block that includes only one particular byte value using the symbols "0 0 0 0". The "top" of the lattice includes a pattern which describes the maximum number of particular byte values for the cache block size (i.e., four particular byte values for a four-byte cache block in this example). In this example, the top of the lattice describes a cache block that includes four particular byte values using the symbols "0 1 2 3". Patterns closer to the top of the lattice describe a greater number of cache blocks—i.e., are more maximal—than patterns closer to the bottom. A cache block pattern at the head of an arrow describes all of the cache blocks describable by a pattern at the root of the arrow, and also describes other cache blocks.

As discussed above, the constraint n on byte dictionary size is derived from a target compressed size in some implementations. Thus, for quantized compression, compressing to a size smaller than the size used to derive n would provide no benefit in some implementations.

Accordingly, returning to FIG. 9, in Phase 2, those patterns in the set of cache block patterns that is output from Phase 1 which are as close to the top of a lattice describing this set as possible, while still meeting the byte dictionary size constraint n, are retained, and are considered maximal with respect to the output of Phase 1.

To illustrate this point, the example lattice of FIG. 11 is assumed, which includes all cache block patterns for 1-, 2-, 3-, and 4-byte dictionaries (i.e., for all cache blocks that are 4 bytes long). Assuming, for example, a constraint of n=3, the patterns that are maximal with respect to the entire lattice, conforming to the constraint, are those that require a 3-byte dictionary. The example recorded pattern traces within the lattice that were input from Phase 1 are indicated in the legend of FIG. 11 (i.e., cache block patterns 0000, 0010, and 0011). Based on this input, none of the patterns in the lattice requiring 3-bytes appears in the input from Phase 1. Accordingly, the patterns input from Phase 1 which are maximal with respect to the training trace, in this example, are 0010 and 0011, since no more maximal patterns appeared in the training trace. The pattern 0000 is non-maximal as it lies at the root of an arrow pointing to one of these patterns (i.e., more maximal patterns appeared in the training trace).

Thus, the output of Phase 2 includes the maximal patterns, and excludes the non-maximal patterns. In addition to eliminating non-maximal patterns from the search, a count of the number of cache blocks described by each of the maximal patterns is tracked. For each maximal pattern, the count includes a count of all patterns less maximal than, or equally maximal to itself. However, since a non-maximal pattern may be less maximal than several maximal patterns, the set of non-maximal patterns and counts are maintained in order to avoid double-counting patterns in later stages. In some implementations, this guarantees that the same set of cache blocks is described in later stages. The non-maximal patterns are excluded from the search itself however. Stated another way, in some implementations, while none of the non-maximal patterns identified in phase 2 are used in the final compression algorithm output, they are potentially used in later phases to choose between the maximal patterns which are potentially included in the final compression algorithm.

The set of patterns that is maximal with respect to the output of Phase 1 (i.e., that is in the output of Phase 2) can represent n or fewer particular byte values of a cache block (i.e., can be used with an n or fewer byte dictionary). However, a pattern that is maximal with respect to the lattice is required to represent n particular byte values of a cache block (i.e., can be used with an n byte dictionary). A pattern that is maximal with respect to the entire lattice is referred to as absolutely maximal, or generally maximal, since it is maximally inclusive independent of a training trace.

If the number of patterns input to Phase 2 is $n_2$, Phase 2 is describable as being of $O(n_2^2)$ complexity.

In Phase 3, relatively maximal patterns (i.e., patterns that are maximal with respect to the training set, but not generally maximal with respect to the lattice) are combined to reduce the number of patterns in the set.

As discussed regarding Phase 2, some patterns are maximal relative to the set of patterns being considered (e.g., patterns present in the training trace), but not relative to the set of all possible patterns. In other words, they are relatively maximal (e.g., maximal with respect to the training trace) but not absolutely maximal (i.e., with respect to the lattice). Patterns that are only relatively maximal do not fully utilize the byte dictionary space available. Such underutilization provides no benefit because additional reductions in size of the compressed block past n bytes is not useful in target hardware applications. Accordingly, in some implementations, patterns in the set that are only relatively maximal are replaced by patterns in the lattice that are more maximal (i.e., with respect to the lattice) and greater than the patterns being replaced while still meeting the constraints, if such patterns exist. Because greater cache block patterns describe all of the cache blocks described by lesser cache block patterns, the greater patterns identified in Phase 3 which did not appear in the training trace are guaranteed to describe at least the same cache blocks (i.e., there is no reduction in described cache blocks after Phase 3).

Returning to FIG. 11, no pattern in the trace was absolutely maximal. The two relatively maximal patterns, 0010 and 0011 are both less maximal than the pattern 0012, which meets the constraint of n=3. Accordingly, the pattern 0012 can be substituted for both 0010 and 0011 in the cache block pattern set such that the same cache blocks (at least) are describable using fewer patterns.

Returning to FIG. 9, some implementations of Phase 3 attempt to combine all pairs of patterns being considered. For example, to combine a pair, the simplest pattern that can describe the union of the sets of cache blocks described by the two patterns in the pair is determined. If that new pattern meets the given byte dictionary size constraint, then the two patterns in the pair are replaced with the new pattern. Any other relatively maximal pattern that is less maximal than the new pattern is also removed. To compute the counter value for the new pattern, the counters for disjoint cache block sets from the first phase are used. In some implementations, Phase 3 continues to combine pairs of cache block patterns in the set that are not absolutely maximal until no pair of cache block patterns can be combined.

If the number of patterns input to Phase 3 is $n_3$, Phase 3 is describable as being of $O(n_3^3)$ complexity.

In Phase 4, a subset of the cache block patterns output from Phase 3 are chosen which represent the greatest number of cache blocks. In some implementations, this subset is chosen through a process which first iteratively sorts the remaining cache block patterns. In the iterative sort, two sets of patterns are maintained. The first set is empty in the first iteration, and the second contains all patterns remaining after Phase 3. In each iteration, the pattern from the second set that increases the number of cache blocks compressed (from the training trace) by the first set is moved from the second set to the first set. Then, the best p patterns from the sorted list are selected.

Figure 12:
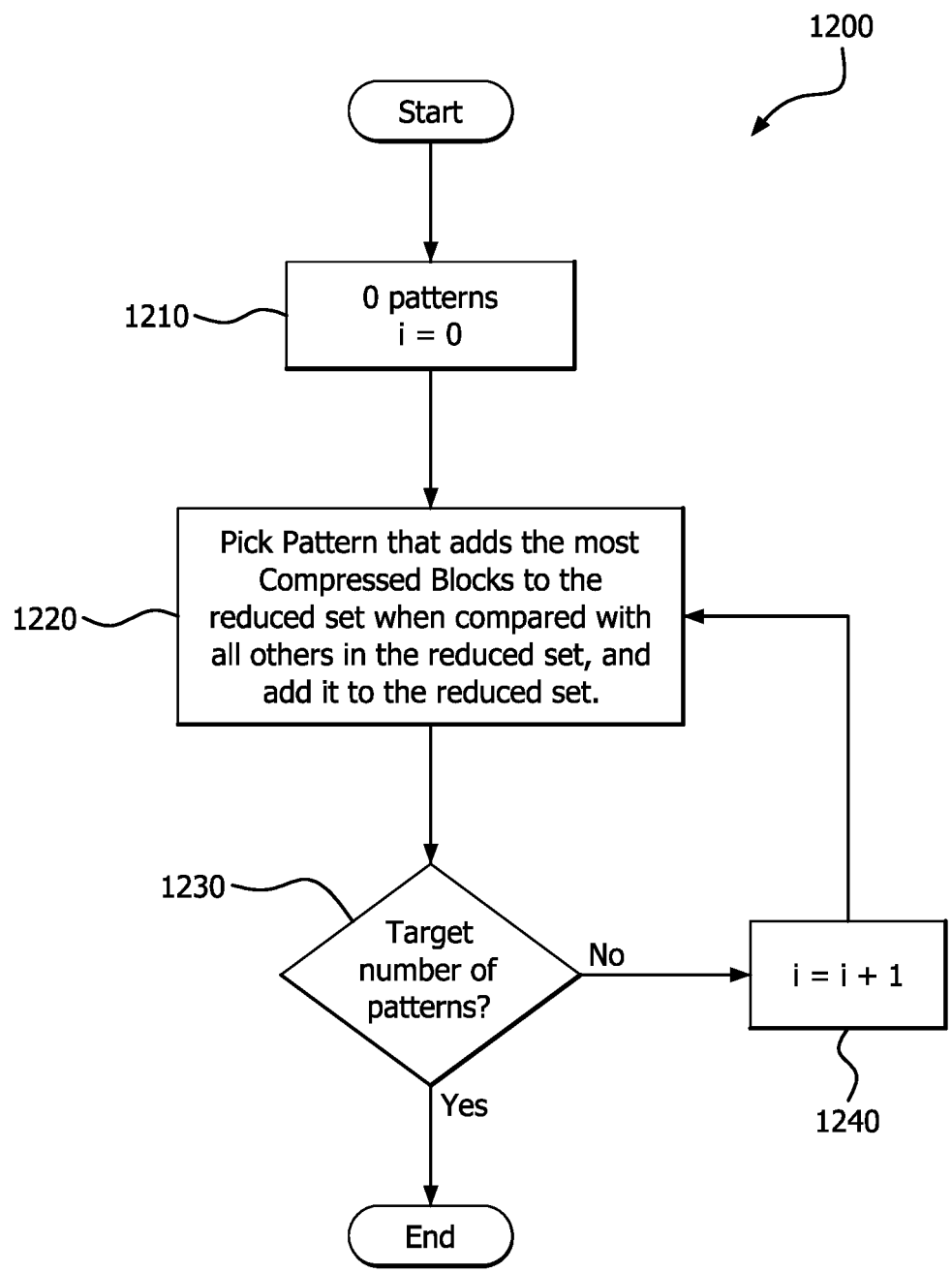
FIG. 12 is a flow chart illustrating an example process for reducing a set of cache block patterns.

FIG. 12 is a flow chart illustrating an example process 1200 for reducing the set of cache block patterns output from Phase 3 of FIG. 9. In step 1210, the process begins with no patterns, and the iteration count i=0. This example iteration counter is used simply for convenience and ease of illustration in the flow chart of FIG. 12, and it is noted that the iterations are trackable in any suitable manner. In step 1220, a pattern is chosen from the list of patterns output from Phase 3 that describes the greatest number of cache blocks. In some implementations, this is determined based on the counter associated with the ranked set of cache block patterns (i.e., the count of cache blocks represented by each pattern) discussed above regarding step 1010.

On condition 1230 that the target number of patterns has not yet been added to the set, the iteration counter increments in step 1240 (or the iterations are otherwise tracked), and step 1220 repeats. The target number of patterns is based on p. After at least one pattern has been added to the set, the next pattern is chosen in later iterations of step 1220 which describes the greatest additional number of cache blocks beyond those already described by patterns in the set. In some implementations building the sorted list of selected patterns iteratively in this way guarantees that the best pattern, given the current sorted list in each iteration, is chosen. In some implementations, this guarantee requires updating the benefit, in terms of describable lines, of adding each remaining pattern to the current set of patterns in every iteration. A* search may be used to make this search practical. In some implementations, a "guarantee" that the best pattern given the current sorted list is chosen is weaker than a guarantee that best set of patterns overall is chosen. In some implementations, the "best" pattern is the pattern which increases the number of cache blocks compressed from the training trace by the current set the most when added to the current set. A* search is an example search algorithm known in the artificial intelligence field.

On condition 1230 that the target number of patterns has been added to the set, the list of cache block patterns is complete, and Phase 4 outputs the list of patterns e.g., to HDL or any other suitable format for later implementation in hardware and/or software.

In some implementations, the iterative sorting of Phase 4 yields a single sorted list of patterns that can be reused for different values of p. Once a sorted list of a large enough size is generated, the top p for any value of p smaller than or equal to the size of the list can be selected.

The output from Phase 4 is a set of p patterns that respects the byte dictionary size constraint n, and is a sorted list of the p best cache block patterns that were input from Phase 3.

Returning to FIG. 9, after the ranked set of cache block patterns has been reduced in step 920, circuitry and/or software can be generated to implement the BSC compressor and/or decompressor based on these patterns. In step 930, RTL or other suitable hardware description code or other description of implementing circuitry is generated for the compression and decompression processes based on the patterns output from Phase 4. FIGS. 3, 4, 5, and 6 are examples of a compression process, compression circuitry, decompression process, and decompression circuitry, respectively, which are generatable in step 930 based on the output of Phase 4.

For example, the cache block pattern set shown and described with respect to step 330 of FIG. 3, logic circuitry 450 of FIG. 4, step 530 of FIG. 5, and logic circuitry 620 of FIG. 6 is generated based on the output of Phase 4 in some implementations.

In some implementations, the RTL or other representation "hard codes" the cache block patterns from Phase 4; i.e., explicitly defines the values of the cache block patterns in hardware. In some implementations, this hard coding has the advantage of facilitating logic synthesis which inputs the RTL or other representation to greatly improve the performance and area characteristics of the resulting hardware as compared with non-hard coded approaches.

Figure 13:
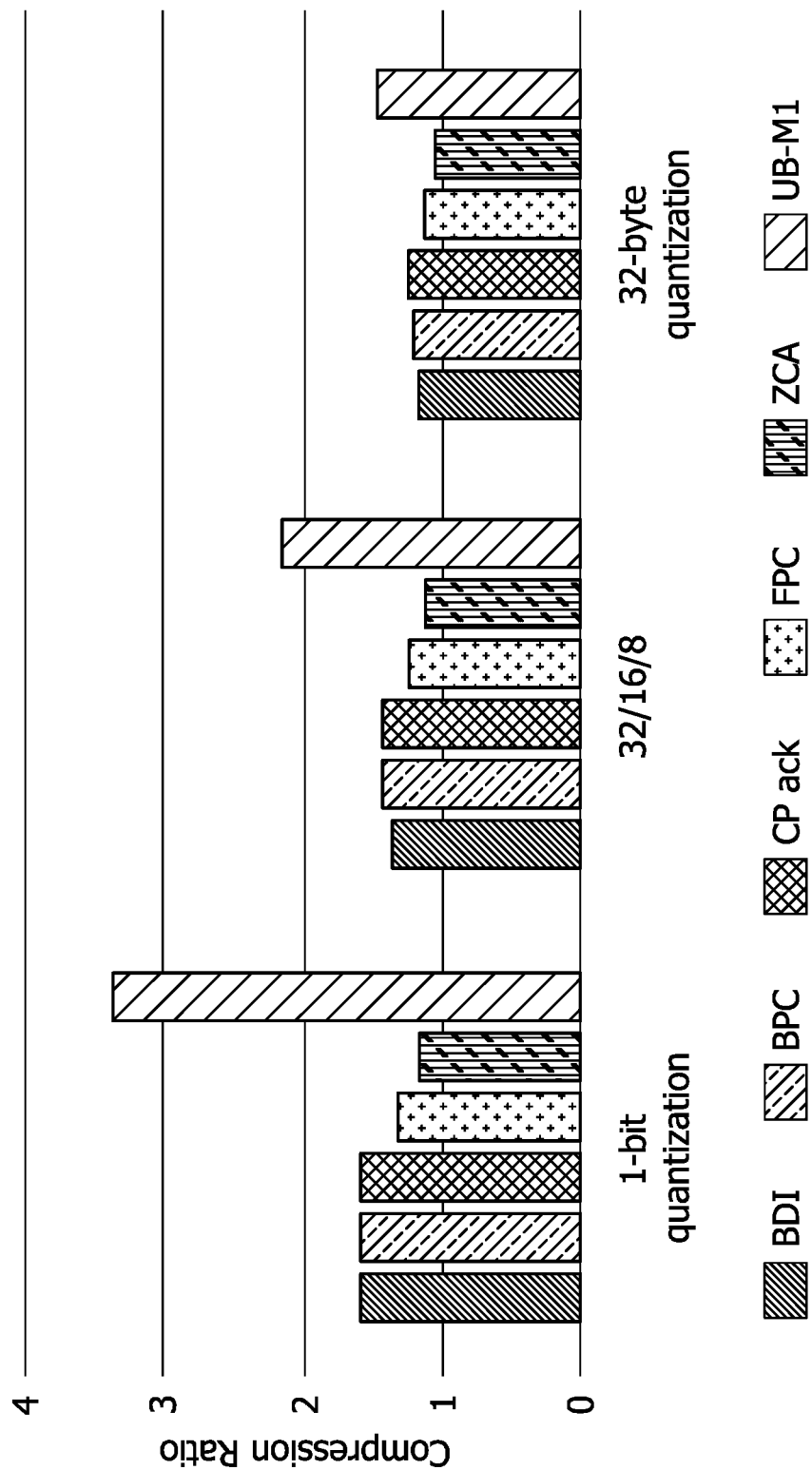
FIG. 13 is a bar graph which illustrates example performance of various compression algorithms.

FIG. 13 is a bar graph which illustrates a comparison of example performance of existing algorithms (Base-Delta-Immediate (BDI), Bit-Plane Compression (BPC), Cache-Packer (CPack), Frequent Pattern Compression (FPC), Zero-Content Augmented (ZCA) with example performance of Byte Select Compression with one byte of metadata (UB-M1), demonstrating that the existing algorithms perform half as well as the ideal performance of an example byte select algorithm. As can be seen from the figure, for example, the compression ratio for ideal byte select performance, UB-M1 is at least twice that of existing algorithms for 1-bit quantization.

Table 6 illustrates example performance and overhead characteristics of various compression algorithms:

TABLE 6

|  | Area (gates) | Latency (cycles) Compression | Latency (cycles) Decompression | Data Reduction Ratio |
|---|---|---|---|---|
| Byte-Select 256 | 64k | 1 | 1 | 0.19 |
| Byte-Select 4096 | 440k | 2 | 1 | 0.21 |
| CPack | 26k | 13 | 8 | 0.15 |
| BPC | 68k | 7 | 7 | 0.15 |
| BDI | — | 1 | 1 | 0.12 |
| FPC | — | 3 | 5 | 0.11 |

In some implementations, data compression in BSC is greater than other algorithms, however single cycle compression and decompression incurs corresponding latencies. In some implementations, die area and compression latency (e.g., one cycle of latency) can be traded for even higher data reduction.

The teachings disclosed herein may be useful in any hardware where data storage capacity and/or data transmission bandwidth is an issue. This includes all CPUs, GPUs, and SoCs. The teachings disclosed herein automate the design of cache block compression algorithms to provide the algorithm with highest number of blocks compressed. It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method implemented in a compressor for performing pattern-based cache block compression, the method comprising:
   inputting an uncompressed cache block;
   identifying byte values within the uncompressed cache block;
   searching for an index to a cache block pattern in a set of cache block patterns based on the byte values; and
   outputting a compressed cache block based on the byte values and the cache block pattern.

2. The method of claim 1, further comprising converting the byte values to symbols and expressing the uncompressed cache block in terms of the symbols, each symbol representing a particular cache block.

3. The method of claim 2, further comprising searching for the index to the cache block pattern in the set of cache block patterns based on the byte values by searching the set of cache block patterns based on the symbols.

4. The method of claim 1, wherein the compressed cache block comprises the byte values and the index to the set of cache block patterns.

5. The method of claim 1, wherein the compressed cache block comprises a byte dictionary and metadata.

6. The method of claim 5, wherein the metadata comprises the index to the cache block pattern.

7. The method of claim 5, wherein the byte dictionary comprises each of the byte values, and for each of the byte values the byte dictionary includes only one copy.

8. A method implemented in a decompressor for performing pattern-based cache block decompression, the method comprising:
   inputting a compressed cache block;
   identifying an index to a cache block pattern based on metadata of the compressed cache block;
   applying the index to the cache block pattern to a byte dictionary of the compressed cache block; and
   outputting an uncompressed cache block based on the cache block pattern and the byte dictionary.

9. The method of claim 8, wherein the compressed cache block comprises byte values and the index to a set of cache block patterns.

10. The method of claim 8, wherein the byte dictionary comprises byte values of the uncompressed cache block.

11. The method of claim 10, wherein the byte dictionary comprises each of the byte values, and for each of the byte values, the byte dictionary includes only one copy.

12. The method of claim 8, wherein the metadata comprises the index to the cache block pattern.

13. The method of claim 8, wherein identifying the cache block pattern based on the metadata of the compressed cache block comprises searching for the cache block pattern in a set of cache block patterns based on the metadata.

14. The method of claim 8, wherein the cache block pattern comprises at least one symbol corresponding to at least one byte of the byte dictionary.

15. The method of claim 8, wherein the compressed cache block comprises byte values.

16. The method of claim 8, wherein the byte dictionary of the compressed cache block comprises particular byte values of the uncompressed cache block.

17. A method for generating hardware configured for pattern-based cache block compression, the method comprising:
   inputting a cache trace;
   determining a set of cache block patterns based on the cache trace;
   determining a subset of cache block patterns from the set of cache block patterns, wherein the subset of cache block patterns is determined based on a set of compressed sizes and a target number of patterns for each size; and
   outputting a description based on the determined subset of cache block patterns.

18. The method of claim 17, wherein determining the subset of cache block patterns further comprises:
   ranking the set of cache block patterns based on frequency of occurrence in the cache trace to generate a set of ranked cache block patterns.

19. The method of claim 18, wherein determining the subset of cache block patterns further comprises:
   reducing the set of ranked cache block patterns by removing patterns occurring in the cache trace below a threshold frequency to generate a set of thresholded cache block patterns; and
   removing cache block patterns that are not maximally inclusive from the set of thresholded cache block patterns to generate a set of locally maximal cache block patterns.

20. The method of claim 19, wherein determining the subset of cache block patterns further comprises:
   combining relatively maximal patterns of the set of locally maximal cache block patterns to generate a set of absolutely maximal cache block patterns; and iteratively sorting subsets of the set of absolutely maximal cache block patterns based on which of the set of absolutely maximal cache block patterns describe more cache blocks to determine the subset of cache block patterns.

* * * * *